United States Patent
Zhao

(10) Patent No.: US 12,452,855 B2
(45) Date of Patent: Oct. 21, 2025

(54) WIRELESS COMMUNICATION METHOD AND APPARATUS, WIRELESS COMMUNICATION SYSTEM, AND DEVICE AND TERMINAL

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 446 days.

(21) Appl. No.: 18/145,906

(22) Filed: Dec. 23, 2022

(65) Prior Publication Data
US 2023/0224889 A1   Jul. 13, 2023

Related U.S. Application Data

(63) Continuation of application No. PCT/CN2020/105647, filed on Jul. 29, 2020.

(51) Int. Cl.
*H04W 72/121* (2023.01)

(52) U.S. Cl.
CPC .................. *H04W 72/121* (2013.01)

(58) Field of Classification Search
CPC .................................................. H04W 72/121
See application file for complete search history.

(56) References Cited

U.S. PATENT DOCUMENTS

| | | | |
|---|---|---|---|
| 2015/0327204 A1 | 11/2015 | Park et al. | |
| 2017/0208561 A1 | 7/2017 | Agiwal et al. | |
| 2019/0253946 A1* | 8/2019 | Hahn | H04W 4/44 |
| 2020/0178271 A1 | 6/2020 | Shi et al. | |
| 2020/0267692 A1* | 8/2020 | Wu | H04W 72/04 |

FOREIGN PATENT DOCUMENTS

| | | |
|---|---|---|
| CN | 101291317 A | 10/2008 |
| CN | 105407532 | 3/2016 |
| CN | 105850194 A | 8/2016 |
| CN | 106576337 | 4/2017 |
| CN | 109565647 | 4/2019 |
| CN | 109644098 | 4/2019 |
| CN | 110830211 | 2/2020 |

(Continued)

OTHER PUBLICATIONS

Convida Wireless, "Design Considerations for NR V2X Synchronization," 3GPP TSG-RAN WG1 Meeting #95, R1-1813615, Nov. 2018.

(Continued)

*Primary Examiner* — Gbemileke J Onamuti
(74) *Attorney, Agent, or Firm* — Hodgson Russ LLP

(57) ABSTRACT

A wireless communication method and a device are provided. The wireless communication system includes a second control device, at least one first control device, and at least one terminal. The second control device transmits a first synchronization signal, where the first synchronization signal provides synchronization information of at least one communication sub-system in a wireless communication system.

17 Claims, 18 Drawing Sheets

(56) References Cited

FOREIGN PATENT DOCUMENTS

CN          111328134       6/2020
WO          2016106685      7/2016

OTHER PUBLICATIONS

Catt, "Feature lead summary on AI 7.2.4.3 Sidelink synchronization mechanism," 3GPP TSG RAN WG1 Meeting #99, R1-1913392, Nov. 2019.
Epo, Extended European Search Report for EP Application No. 20947094.7, Aug. 8, 2023.
LG Electronics, "Discussion on synchronization enhancement for IoT and wearables," 3GPP TSG-RAN1 Meeting #89, R1-1707581, May 2017.
CNIPA, First Office Action for CN Application No. 202080098350. X, Jun. 9, 2023.
Wipo, International Search Report and Written Opinion for International Application No. PCT/CN2020/105647, Feb. 5, 2021.
CNIPA, Office Action issued for CN Application No. 202080098350. X, Apr. 30, 2024.
CNIPA, Second Office Action for CN Application No. 202080098350. X, Feb. 1, 2024.

\* cited by examiner

WIRELESS COMMUNICATION METHOD AND APPARATUS, WIRELESS COMMUNICATION SYSTEM, AND DEVICE AND TERMINAL

CROSS-REFERENCE TO RELATED APPLICATION(S)

This application is a continuation of International Application No. PCT/CN2020/105647, filed Jul. 29, 2020, the entire disclosure of which is incorporated herein by reference.

TECHNICAL FIELD

This disclosure relates to the field of wireless communication technology, and particularly to a wireless communication method and a device.

BACKGROUND

At present, communication protocol issued by the 3rd generation partnership project (3GPP) specify the specific processes of synchronization and resource configuration between terminals and base stations in wireless communication systems such as long term evolution (LTE) communication system, new radio (NR) communication system, and sidelink (SL) communication system.

However, for the case where there are multiple control devices and multiple controlled devices in a wireless communication system, and the multiple control devices and the multiple controlled devices form multiple communication sub-systems, according to the existing communication protocol, the controlled devices cannot achieve synchronization with the control devices in the communication sub-system to which the controlled devices belong, and cannot obtain the resource configuration information corresponding to the communication sub-system to which the controlled devices belong, so further research is needed.

SUMMARY

In a first aspect, a wireless communication method is provided in implementations of the disclosure, which includes receiving, by a first control device, a first synchronization signal from a second control device; and determining, by the first control device, synchronization information of a first system to which the first control device belongs according to the first synchronization signal.

In a second aspect, a wireless communication method is provided in implementations of the disclosure, which includes transmitting, by a second control device, a first synchronization signal, where the first synchronization signal provides synchronization information of at least one communication sub-system in a wireless communication system.

In a third aspect, a device is provided in implementations of the disclosure, which is a first control device and includes a transceiver, a processor, and a memory storing computer programs which, when executed by the processor, are operable with the processor to: cause the transceiver to receive through the communication unit a first synchronization signal from a second control device; and determine synchronization information of a first system to which the first control device belongs according to the first synchronization signal.

BRIEF DESCRIPTION OF THE DRAWINGS

The following is a brief introduction of the drawings used in the detailed description or the related art.

DETAILED DESCRIPTION

Figure 1:
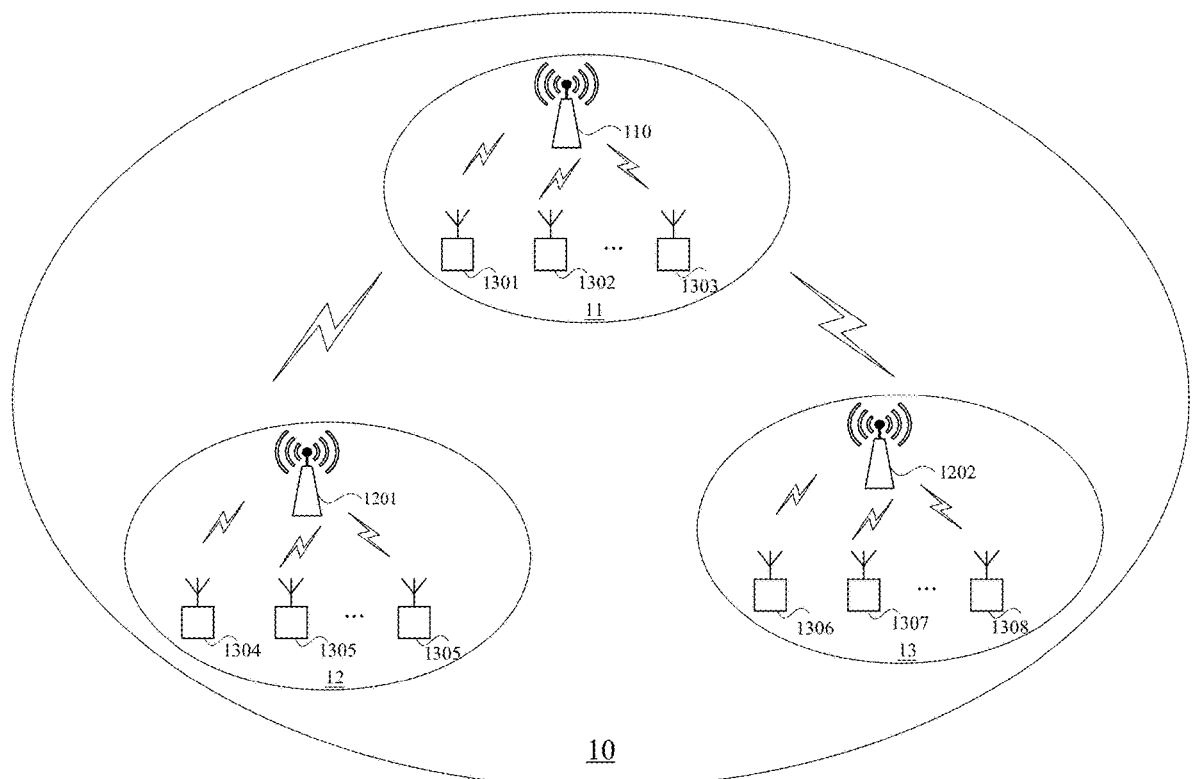
FIG. 1 is an architecture diagram of a wireless communication system provided in implementations of the disclosure.

The following will describe technical solutions of implementations of the present disclosure with reference to the accompanying drawings. Apparently, implementations described herein are merely some implementations, rather than all implementations, of the present disclosure. Based on the implementations of the present disclosure, all other implementations obtained by those of ordinary skill in the art without creative effort shall fall within the protection scope of the present disclosure.

Disclosed herein are implementations of a wireless communication method and a wireless communication apparatus, a wireless communication system, a device, and a terminal, for achieving synchronization between a second control device and a first control device, synchronization between the second control device and a terminal, or synchronization between the first control device and the terminal. It is also conductive to reducing the frequency-band resource occupied by the second control device for transmitting a synchronization signal and conductive to simplifying the deployment complexity of the entire wireless communication system.

The technical solutions of implementations of the present disclosure are applicable to various wireless communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area networks (WLAN), a wireless fidelity (WiFi), 5th-generation (5G) system, or other communication systems.

Generally speaking, a conventional wireless communication system generally supports a limited number of connections and therefore is easy to be implemented. However, with development of communication technology, a communication system will not only support conventional wireless communication but also support, for example, device to device (D2D) communication, machine to machine (M2M) communication, machine type communication (MTC), vehicle to vehicle (V2V) communication, and vehicle to everything (V2X) communication. Implementations of the present disclosure are also applicable to these communication systems.

Optionally, the wireless communication system in implementations of the disclosure is applicable to a carrier aggregation (CA) scenario, a dual connectivity (DC) scenario, and a standalone (SA) networking scenario.

Optionally, the wireless communication system in implementations of the disclosure is applicable to unlicensed spectrums. The unlicensed spectrum can be considered as shared spectrum. Alternatively, the communication system in implementations of the disclosure is applicable to licensed spectrums. The licensed spectrum can be considered as unshared spectrum.

Implementations of the disclosure are described in combination with primary control devices, secondary control devices, and controlled devices.

Specifically, the primary control device can be user equipment (UE), mobile devices, user terminals, smart terminals, wireless communication apparatus, network devices, relay devices, etc., can be microphones, speakers, stereos, cameras, rearview mirrors, car screens, dash cams, 360 view, door lock control, seat control, air conditioning control, light control, windows, door locks, car keys, telematics boxes (T-box), cockpit controllers and other on-board equipment, can be an internet of things (IOT) device such as refrigerators, kitchens, televisions, lamps, relay devices, and consumer premise equipment (CPE), can also be wearable equipment such as glasses, gloves, watches, clothing, shoes, bracelets, jewelry, etc.

Specifically, the secondary control device can be user equipment (UE), mobile devices, user terminals, smart terminals, wireless communication apparatus, network devices, relay devices, etc., can be microphones, speakers, stereos, cameras, rearview mirrors, car screens, dash cams, 360 view, door lock control, seat control, air conditioning control, light control, windows, door locks, car keys, telematics boxes (T-box), cockpit controllers and other on-board equipment, can be an internet of things (IOT) device such as refrigerators, kitchens, televisions, lamps, relay devices, and consumer premise equipment (CPE), can also be wearable equipment such as glasses, gloves, watches, clothing, shoes, bracelets, jewelry, etc.

Specifically, the controlled device can be user equipment (UE), mobile devices, user terminals, smart terminals, wireless communication apparatus, network devices, relay devices, etc., can be microphones, speakers, stereos, cameras, rearview mirrors, car screens, dash cams, 360 view, door lock control, seat control, air conditioning control, light control, windows, door locks, car keys, telematics boxes (T-box), cockpit controllers and other on-board equipment, can be an internet of things (IOT) device such as refrigerators, kitchens, televisions, lamps, relay devices, and consumer premise equipment (CPE), can also be wearable equipment such as glasses, gloves, watches, clothing, shoes, bracelets, jewelry, etc.

In implementations of the disclosure, the primary control device, the secondary control device, and the controlled device can be deployed on land, such as indoor or outdoor, handheld, wearable, or vehicle mounted, can be deployed on water, such as on ships, can also be deployed in the air, such as in aircraft, balloons, and satellites.

Exemplarily, FIG. 1 illustrates the wireless communication system 10 according to implementations of the disclosure. The wireless communication system 10 may include a primary control device 110, at least one secondary control device 120, and at least one controlled device 130. The primary control device 110, the at least one secondary control device 120, and the at least one controlled device 130 can be located in communication sub-systems of the wireless communication system 10. The primary control device 110 can provide synchronization information and resource configuration information to a communication sub-system to which the at least one secondary control device 120 belongs or a communication sub-system to which the at least one controlled device 130 belongs. Besides, the at least one secondary control device 120 can also provide synchronization information and resource configuration information to a controlled device in the communication sub-system to which the at least one secondary control device 120 belongs. It should be noted that, the communication connection can be a wireless connection or part can be a wired connection, which is not particularly limited.

Specifically, the primary control device 110, a controlled device 1301, a controlled device 1302, and a controlled device 1303 etc. can form a communication sub-system 11. The primary control device 110 can control or provide synchronization information and resource configuration information of all controlled devices in the communication sub-system 11, such that all the controlled devices in the communication sub-system 11 are synchronized with the primary control device 110, and all controlled devices in the communication sub-system 11 can obtain the resource configuration information of the communication sub-system 11.

Specifically, the secondary control device 1201, the controlled device 1304, the controlled device 1305, and the controlled device 1306 etc. can form a communication sub-system 12. The secondary control device 1201 can control or provide synchronization information and resource configuration information of all controlled devices in the communication sub-system 12, and the primary control device 110 can control or provide synchronization information and resource configuration information of the secondary control device 1201, or control or provide synchronization information and resource configuration information of all controlled devices in the communication sub-system 12, such that all controlled devices in the communication sub-system 12 are synchronized with the secondary control device 1201, and all controlled devices in the communication sub-system 12 can obtain the resource configuration information of the communication sub-system 12.

Specifically, the secondary control device 1202, the controlled device 1306, the controlled device 1307, and the controlled device 1308 etc. can form a communication sub-system 13. The secondary control device 1202 can control or provide synchronization information and wireless communication resource of all controlled devices in the communication sub-system 13, and the primary control device 110 can control or provide synchronization information and resource configuration information of the secondary control device 1202, or control or provide synchronization information and resource configuration information of all controlled devices in the communication sub-system 13, such that all controlled devices in the communication sub-system 13 are synchronized with the secondary control device 1202, and all controlled devices in the communication sub-system 13 can obtain the resource configuration information of the communication sub-system 13.

Specifically, the communication sub-system 11, the communication sub-system 12, and the communication sub-system 13 can communicate within the same spectrum bandwidth in the same wireless communication manner.

Before detailed introduction of the wireless communication method provided in implementations of the disclosure, the communication system and communication technology related to the implementations will be introduced first.

(1) Synchronization Mechanism in LTE Communication System

In the LTE communication system, after power on, a terminal receives a primary synchronization signal (PSS) at several central frequency points of a frequency band where LTE cells may exist, and determines existence of cells at the several frequency points according to a signal strength of the PSS received. If the terminal saves the frequency point and the operator information at the time of last power off, after power on, the terminal will first attempt to access the cell where it stayed last time; if the terminal does not save it, the terminal needs to scan full frequency band within the frequency band allocated to the LTE system.

It should be noted that, the PSS occupies six physical resource blocks (PRB) of the central frequency band and repeats with a period of 5 ms. First, the terminal can obtain a cell identity (ID) of a LTE cell group by receiving the PSS. When determining the slot boundary of 5 ms, by receiving the PSS, the terminal can also obtain a length of a cell cyclic prefix and a duplex mode (FDD or TDD) that the cell adopts. After slot synchronization of 5 ms, the terminal will search forward for secondary synchronization signal (SSS) based on the PSS. The SSS is composed of two random sequences, and the mapping of the first half frame and the second half frame is opposite, therefore, the terminal can determine the boundary of "10 ms" as long as two SSS are received, so as to achieve frame synchronization. Since the SSS carries cell group ID, the terminal can obtain the physical layer ID (CELL ID) according to the PSS and the SSS, and then obtains configuration information of downlink reference signals. Since the PSS and the SSS are transmitted on the six middle resource blocks (RB) of a system bandwidth and are transmitted symmetrically within the system bandwidth, the terminal can also achieve frequency synchronization by receiving the PSS and the SSS. Finally, after obtaining information of frame synchronization, frequency synchronization, and downlink reference signals etc., the terminal will continue to receive downlink reference signals to achieve precise slot synchronization and frequency synchronization. Then the terminal continues to read a physical broadcast channel (PBCH) to obtain a system frame number, bandwidth information, physical hybrid ARQ indicator channel (PHICH) configuration, antenna configuration and other resource configuration information, thereby achieving synchronization and resource configuration between the terminal and the cell.

(2) Synchronization Mechanism in NR Communication System

In NR communication system, the PSS, the SSS, and a PBCH form a synchronization signal and PBCH block (SSB). In NR system, possible time-frequency resource locations for SSB are defined, and the terminal will try to search for SSB during synchronization. Since SSB carries SSB index, and SSB indexes are in one-to-one correspondence with locations of SSBs in a wireless frame, the terminal can determine the location of the SSB in the wireless frame after obtaining the SSB index, so as to determine the boundary of the wireless frame to achieve frame synchronization.

Figure 2:
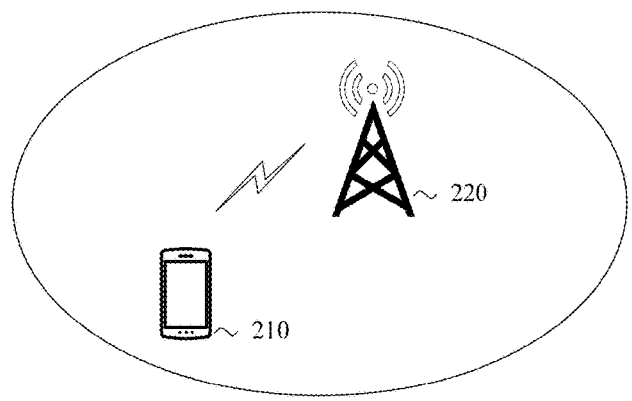
FIG. 2 is an architecture diagram of a cellular mobile communication system provided in implementations of the disclosure.

Specifically, as illustrated in FIG. 2, the terminal 210 receives the PSS and the SSS transmitted by a base station 220 to achieve timing synchronization, and then receives a PBCH. Information carried by the PBCH includes primary information block (MIB) information and 8-bit physical layer information. The physical layer information includes a system frame number (SFN), half frame indication, SSB index etc., while the MIB includes 6-bit SFN information field, 1-bit subcarrier spacing information field, 4-bit subcarrier offset information field regarding SSB, and 8-bit physical downlink control channel (PDCCH) configuration information field regarding system information block type 1 (SIB1). Finally, the terminal 210 synchronizes with the base station 220 by reading SIB 1 message and other messages transmitted by the system.

(3) Synchronization Mechanism in Sidelink (SL) Communication System

Figure 3:
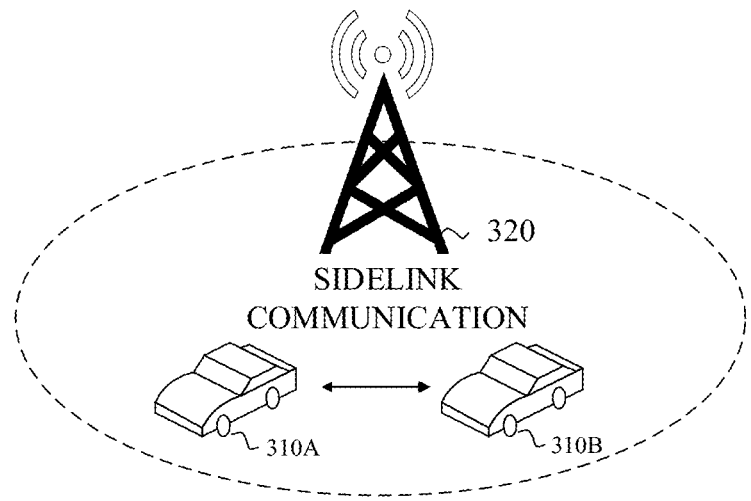
FIG. 3 is an architecture diagram of a sidelink (SL) communication system provided in implementations of the disclosure.
Figure 4:
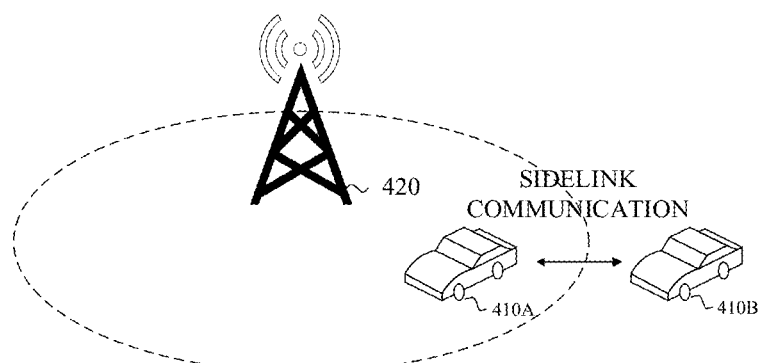
FIG. 4 is another architecture diagram of a sidelink (SL) communication system provided in implementations of the disclosure.
Figure 5:
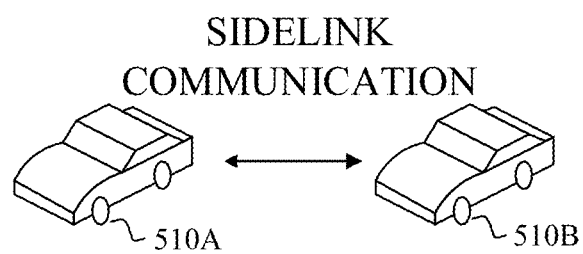
FIG. 5 is another architecture diagram of a sidelink (SL) communication system provided in implementations of the disclosure.

In SL communication system, according to the network coverage where terminals are located, communication scenarios can be divided into SL communication within network coverage (as illustrated in FIG. 3), SL communication within partial network coverage (as illustrated in FIG. 4), and SL communication outside network coverage (as illustrated in FIG. 5).

In the SL communication within network coverage as illustrated in FIG. 3, all terminals (terminal 310A and terminal 310B) in SL communication are within the coverage of the same base station 320, and the terminal 310A and the terminal 310B can obtain synchronization information by receiving the downlink synchronization signal transmitted by the base station 320, and obtain SL resource configuration information by receiving the system message transmitted by the base station 320.

In the SL communication within partial network coverage as illustrated in FIG. 4, part (terminal 410A) of the terminals in SL communication are within the coverage of the base station 420 and therefore the terminal 410A can receive the downlink synchronization signal transmitted by the base station 420 to obtain synchronization information, and then receive the system message transmitted by the base station 420 to obtain SL resource configuration information. For terminals (terminal 410B) outside the network coverage, since the terminal 410B is unable to receive the downlink synchronization signal and the system message transmitted by the base station 420, the terminal 410B will obtain the synchronization information by receiving the SL synchronization signal and the PBCH transmitted by the terminal 410A, and then determines further SL resource configuration information according to pre-configuration information.

In the SL communication outside network coverage as illustrated in FIG. 5, all terminals (terminal 510A and terminal 510B) are outside network coverage, therefore the terminal 510A transmits synchronization signal and a PBCH to the terminal 510B, and the terminal 510B obtain synchronization information by receiving the synchronization signal and the PBCH, and then determines SL resource configuration information according to pre-configuration information.

(4) In-Vehicle Short-Distance Communication System

The in-vehicle short-distance communication system includes multiple devices such as central controllers, microphones, speakers, rearview mirrors, dash cams, 360 view, door lock control, seat control, air conditioning control, light control, etc. The above devices can be divided into different communication groups or grouped into different communication sub-systems, and each communication sub-system can have one device for controlling other devices, that is, control device. That is to say, the control device can control other devices in the communication sub-system to which the control device belongs, for example, the control device can allocate transmission resource for other devices and forward data between other devices. In addition, there may be different communication sub-systems for the same vehicle, and the different communication sub-systems can communicate with the same frequency-band resource such as carrier and bandwidth in the same wireless transmission manner.

For example, telematics BOX (T-BOX) in a vehicle can form a communication sub-system with the microphone and the speaker in the same vehicle; a cockpit controller in the vehicle can form a communication sub-system with windows, doors, lights, and seats in the same vehicle; a central controller in the vehicle can form a communication sub-system with a microphone, a speaker, and a rearview mirror in the same vehicle; and a passive entry passive start (PEPS) of the vehicle can form a communication sub-system with the lock, key, etc. of the same vehicle.

The communication protocol issued by 3rd generation partnership project (3GPP) specifies procedures for synchronization and resource configuration between terminals and base stations in wireless communication systems such as LTE communication system, NR communication system, and SL communication system.

However, for a scenario where there are multiple control devices and multiple controlled devices in a wireless communication system and the multiple control device and the multiple controlled device form multiple communication sub-systems, according to the current communication protocol, it is unable for the controlled device to synchronize with the control device in the communication sub-system to which the controlled device belongs, and unable to obtain the resource configuration information corresponding to the communication sub-system to which the controlled device belongs, therefore further research is needed.

In the wireless communication system composed of communication sub-systems, how to achieve synchronization with the control device in the communication sub-system to which the terminal belongs and obtain corresponding resource configuration information has become an urgent problem. Solutions are provided in this regard. The technical schemes of implementations of the disclosure is applicable to the following scenarios.

(1) In-Vehicle Communication Scenario

A vehicle includes multiple controlled devices, such as a speaker, an audio, a camera, a rear-view mirror, etc., and the control device in the vehicle can control the above controlled devices. Multiple controlled devices and a corresponding control device in the same vehicle form multiple communication sub-systems. The control device may include a primary control device and a secondary control device, the primary control device can control the secondary control device and the controlled device and the secondary control device can control the controlled device. The communication sub-systems can communicate with the same frequency-band resource such as carrier and bandwidth in the same wireless transmission manner. Reference can be made to "in-vehicle short-distance communication system" described above and will not be repeated herein.

(2) Smart Home or Indoor Scenario

In the smart home or indoor scenario, multiple devices in the home or room have a communication function and the multiple devices form multiple communication sub-systems. Each communication sub-system has a corresponding control device, such as a smart phone, a smart appliance, a consumer premise equipment (CPE), a relay device, a smart home, etc. Other homes may have other communication sub-systems, and the communication sub-systems can communicate with the same frequency-band resource such as carrier and bandwidth in the same wireless transmission manner.

For the above "in-vehicle communication scenario" and "smart home or indoor scenario", the wireless communication system in implementations of the disclosure can be further divided into the following four specific communication scenarios.

Figure 6:
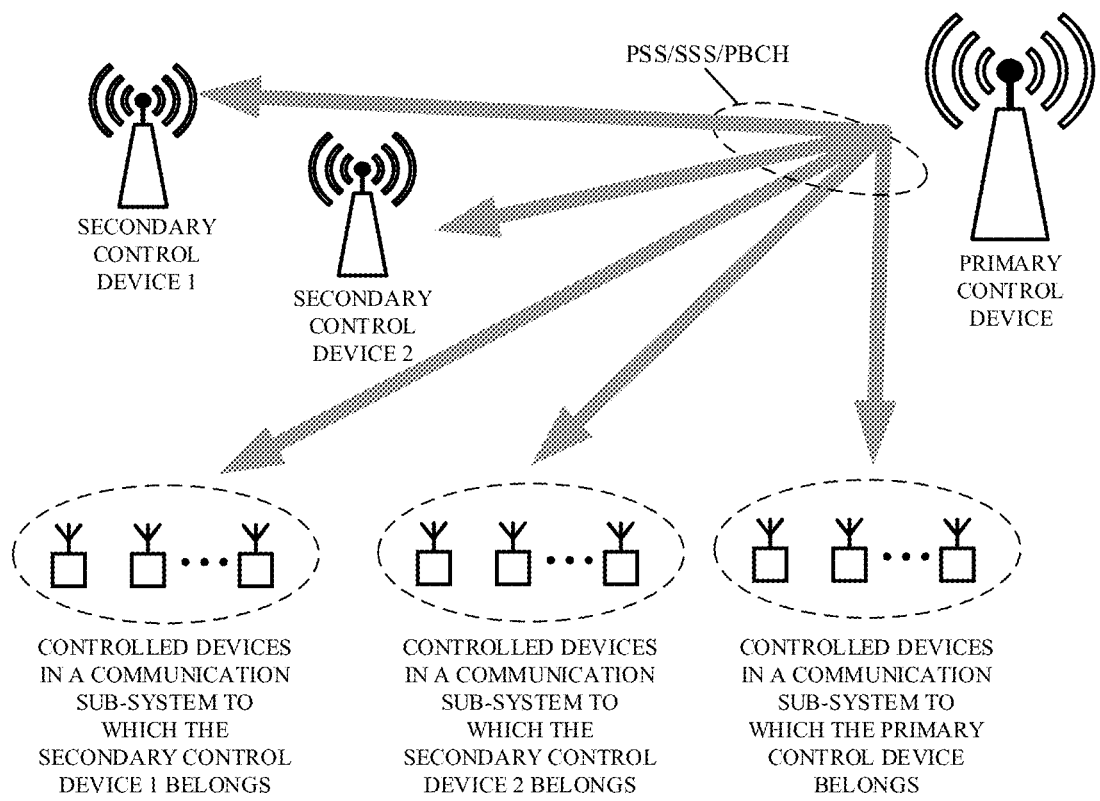
FIG. 6 is another architecture diagram of a wireless communication system provided in implementations of the disclosure.

(1) Communication Scenario 1:

At least two communication sub-systems in a wireless communication system include a primary control device, at least one secondary control device, and at least one controlled device. First, the primary control device is associated with each of the at least one secondary control device, in other words, the primary control device can control each of the at least one secondary control device. For example, the primacy control device can configure resource information required for communication between secondary control devices. Second, a communication sub-system to which the primary control device belongs is different from a communication sub-system to which each secondary control device of the at least one controlled device belongs. For example, in FIG. 1, the primary control device 110 is located in communication sub-system 11 and the secondary control device 1201 is located in communication sub-system 12. Each of the at least one controlled device can be located in the communication sub-system to which the primary control device belongs or located in the communication sub-system to which the controlled device belongs. For example, in FIG. 1, the controlled device 1301 is located in the communication sub-system 11, and the controlled device 1304 is located in the communication sub-system 12. The primary control device can transmit a primary synchronization signal (PSS), a secondary synchronization signal (SSS), and a PBCH. The PSS and the SSS can provide synchronization information of all communication sub-systems in the wireless communication system, and the PBCH can indicate related resource configuration information of all communication sub-systems in the wireless communication system directly or indirectly. As illustrated in FIG. 6, the secondary control devices and the controlled devices in each communication sub-system can read the PSS, the SSS, and the PBCH to obtain the synchronization information and the related resource configuration information of their communication sub-systems. It should be noted that, FIG. 6 is merely an example for "communication scenario 1", and the wireless communication system in "communication scenario 1" can also include other primary control devices, other secondary control devices, or other controlled devices, which is not limited herein.

Figure 7:
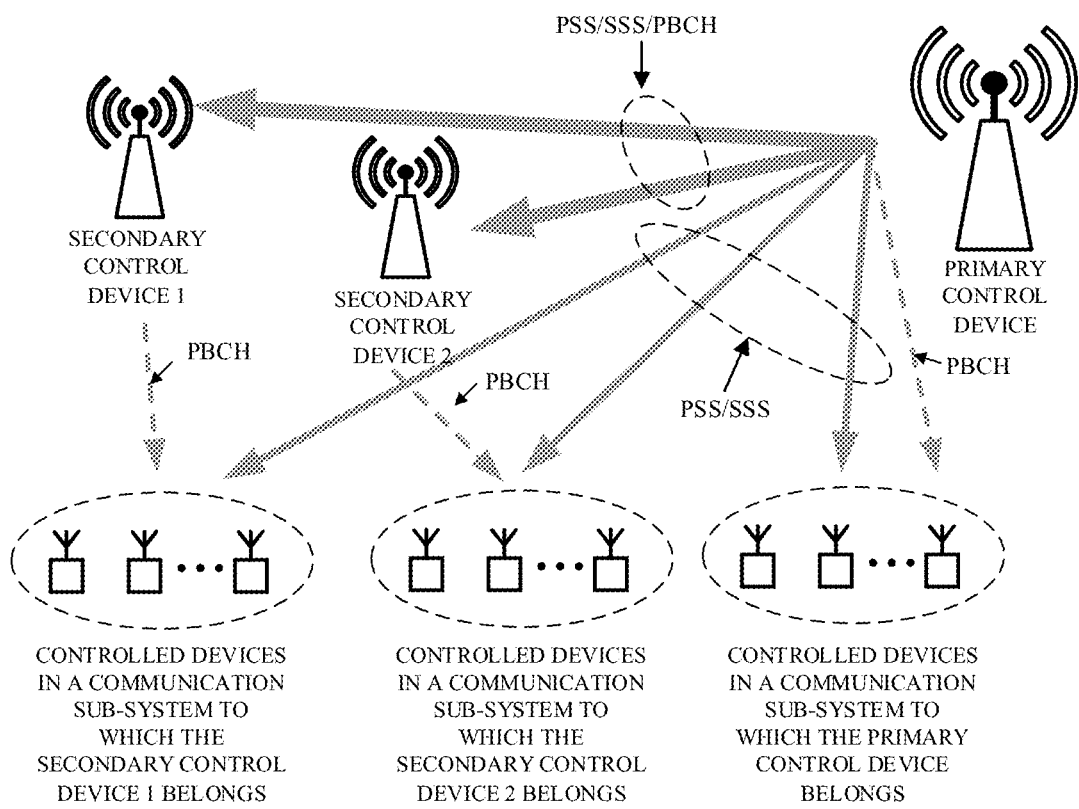
FIG. 7 is another architecture diagram of a wireless communication system provided in implementations of the disclosure.

(2) Communication Scenario 2:

At least two communication sub-systems in the wireless communication system each include a primary control device, at least one secondary control device, and at least one controlled device. First, the primary control device is associated with each of the at least one secondary control device. Second, a communication sub-system to which the primary control device belongs is different from a communication sub-system to which each secondary control device of the at least one controlled device belongs. Each of the at least one controlled device can be located in the communication sub-system to which the primary control device belongs or located in the communication sub-system to which the controlled device belongs. The primary control device transmits a primary synchronization signal (PSS), a secondary synchronization signal (SSS), and a PBCH to a secondary control device associated with the primary control device, transmits a PSS, a SSS, and a PBCH to a terminal in the communication sub-system to which the primary control device belongs. The primary control device transmits a PSS and a SSS to other controlled devices which belongs to other communication sub-systems. The secondary control device in each communication sub-system transmits a PBCH to a controlled device in the communication sub-system to which the secondary control device belongs. The PSS and the SSS can provide synchronization information of all communication sub-systems in the wireless communication system, and the PBCH transmitted by the secondary control device can carry related resource configuration information of a corresponding communication sub-system. The secondary control device and the controlled device in each communication sub-system can obtain the synchronization information of the communication sub-system by reading the PSS and the SSS, and the controlled device in each communication sub-system can obtain the related resource configuration information of the communication sub-system by reading the PBCH transmitted by the corresponding secondary control device, as illustrated in FIG. 7. It should be noted that, FIG. 7 is only an example of "communication scenario 2", and the wireless communication system in "communication scenario 2" can also include other primary control devices, other secondary control devices, and other controlled devices, which is not limited herein.

(3) Communication Scenario 3

Figure 8:
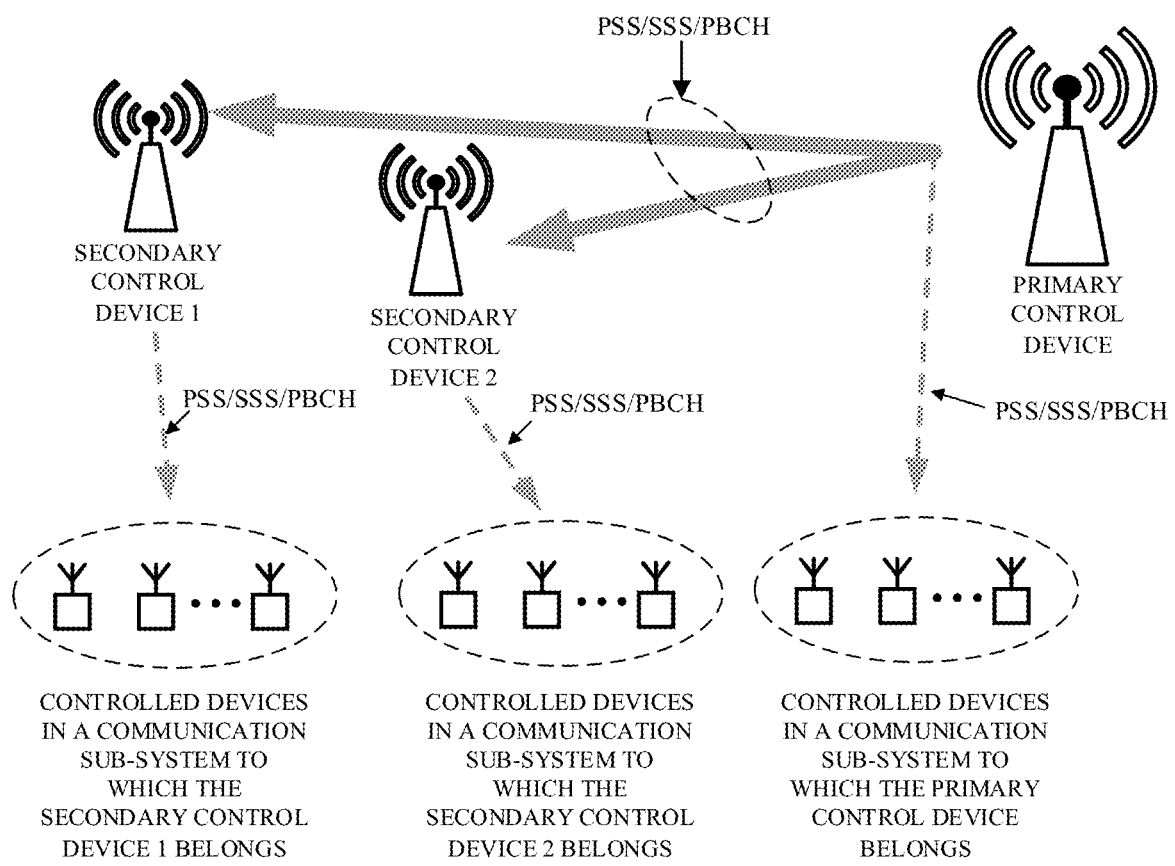
FIG. 8 is another architecture diagram of a wireless communication system provided in implementations of the disclosure.

At least two communication sub-systems in the wireless communication system each include a primary control device, at least one secondary control device, and at least one controlled device. First, the primary control device is associated with each of the at least one secondary control device. Second, a communication sub-system to which the primary control device belongs is different from a communication sub-system to which each secondary control device of the at least one controlled device belongs. Each of the at least one controlled device can be located in the communication sub-system to which the primary control device belongs or located in the communication sub-system to which the controlled device belongs. The primary control device transmits a primary synchronization signal (PSS), a secondary synchronization signal (SSS), and a PBCH to a controlled device associated with the primary control device, transmits PSS, a SSS, and a PBCH to a controlled device in the communication sub-system to which the primary control device belongs. The secondary control device in each communication sub-system transmits a PSS, a SSS, and a PBCH to a controlled device in the communication sub-system to which the secondary control device belongs. The PBCH transmitted to the secondary control device by the primary control device carries information indicating time-frequency resource location for the secondary control device to transmit the synchronization signal and the PBCH in the communication sub-system to which the secondary control device belongs, and the PBCH transmitted by the secondary control device can carry related resource configuration information of the corresponding communication sub-system. Finally, the controlled device in each communication sub-system can obtain the synchronization information of the corresponding communication sub-system by reading the synchronization signal transmitted by the secondary control device, and obtain related resource configuration information of the corresponding communication sub-system by reading the PBCH transmitted by the secondary control device, as illustrated in FIG. 8. It should be noted that, FIG. 8 is only an example of "communication scenario 3", and the wireless communication system in "communication scenario 3" can also include other primary control devices, other secondary control devices, and other controlled devices, which is not limited herein.

(4) Communication Scenario 4

Figure 9:
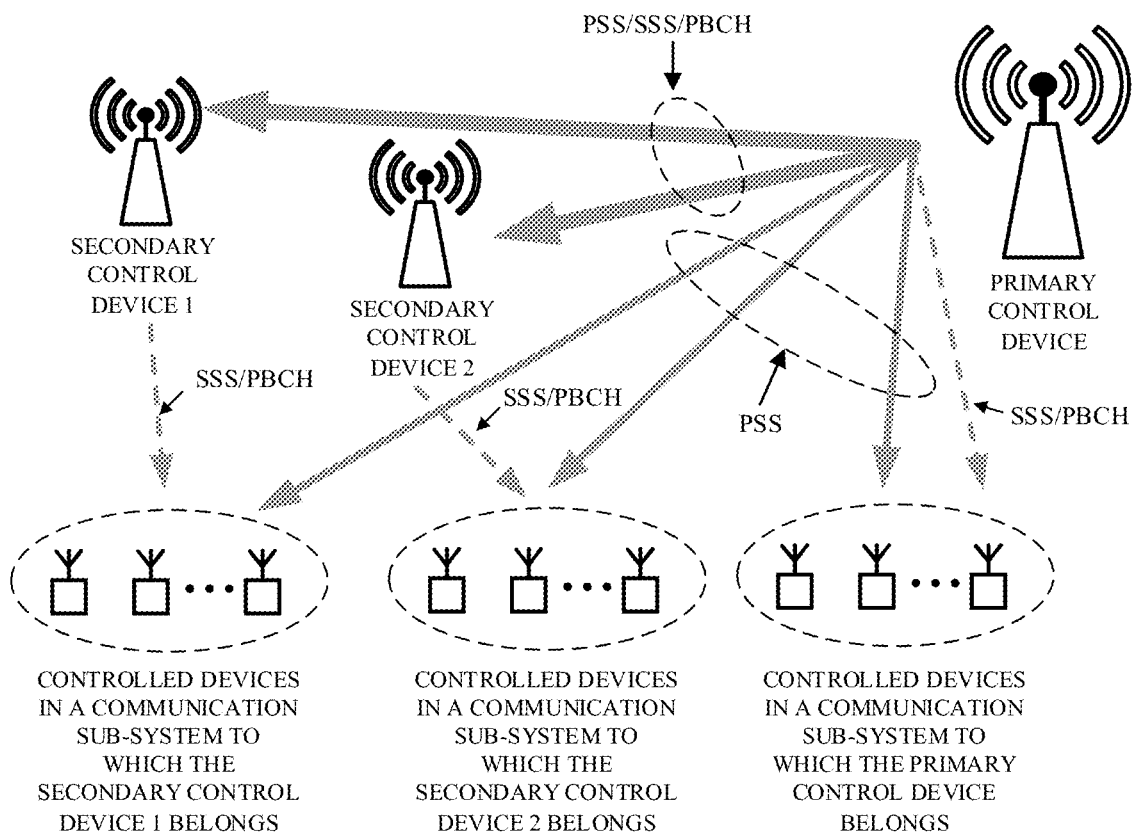
FIG. 9 is another architecture diagram of a wireless communication system provided in implementations of the disclosure.

At least two communication sub-systems in the wireless communication system each include a primary control device, at least one secondary control device, and at least one controlled device. First, the primary control device is associated with each of the at least one secondary control device. Second, a communication sub-system to which the primary control device belongs is different from a communication sub-system to which each secondary control device of the at least one controlled device belongs. Each of the at least one controlled device can be located in the communication sub-system to which the primary control device belongs or located in the communication sub-system to which the controlled device belongs. The primary control device transmits a primary synchronization signal (PSS), a secondary synchronization signal (SSS), and a PBCH to a secondary control device associated with the primary control device, transmits a PSS, a SSS, and a PBCH to a terminal in the communication sub-system to which the primary control device belongs. The primary control device transmits a PSS to other controlled devices which belongs to other communication sub-systems. The secondary control device in each communication sub-system transmits a SSS and a PBCH to a controlled device in the communication sub-system to which the secondary control device belongs. The PSS transmitted by the primary control device can provide initial synchronization information of all communication sub-systems in the wireless communication system. The PBCH transmitted to the secondary control device by the primary control device carries information indicating time-frequency resource location for the secondary control device to transmit the secondary synchronization signal and the PBCH in the communication sub-system to which the secondary control device belongs, and the PBCH transmitted by the secondary control device can carry related resource configuration information of the corresponding communication sub-system. Finally, the controlled device of each communication sub-system can obtain synchronization information of the corresponding communication sub-system by reading the PSS transmitted by the primary control device and the SSS transmitted by the secondary control device, and the controlled device of each communication sub-system can obtain related resource configuration information of the corresponding communication sub-system by reading the PBCH transmitted by a corresponding secondary control device, as illustrated in FIG. 9. It should be noted that, FIG. 9 is only an example of "communication scenario 4", and the wireless communication system in "communication scenario 4" can also include other primary control devices, other secondary control devices, and other controlled devices, which is not limited herein.

Figure 10:
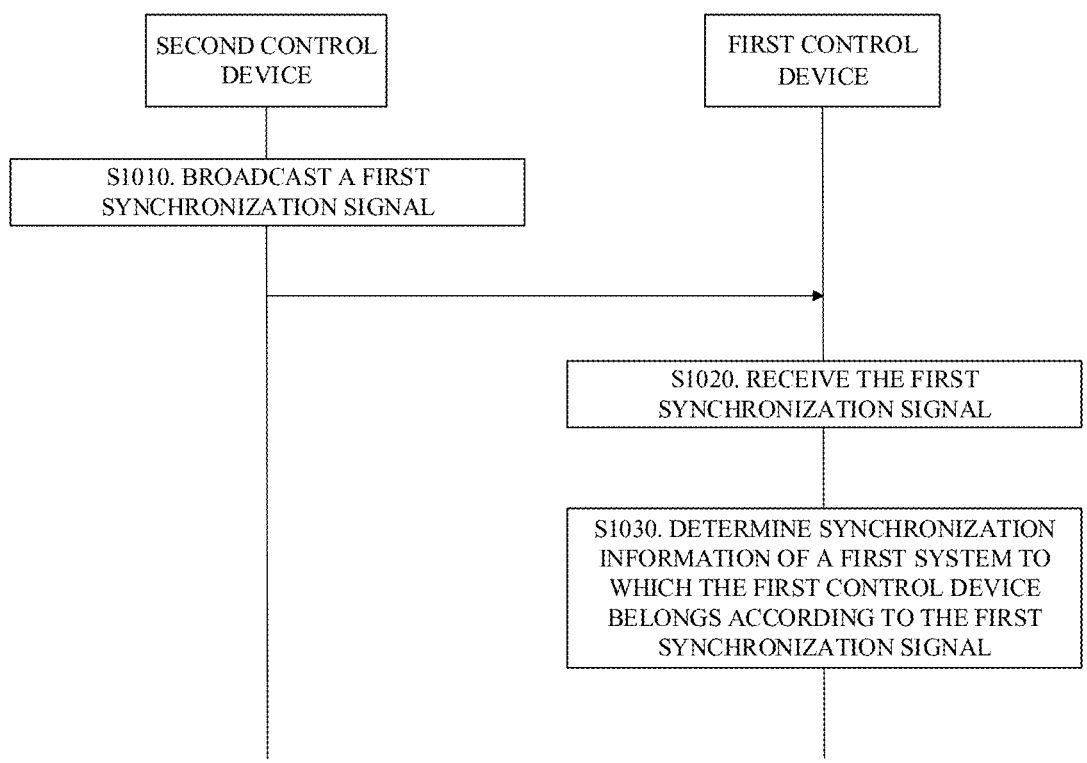
FIG. 10 is a schematic flowchart of a wireless communication method provided in implementations of the disclosure.

For the above "communication scenario 1", "communication scenario 2", "communication scenario 3", or "communication scenario 4", a wireless communication method is provided in implementations of the disclosure, FIG. 10 is a flowchart of the method. The wireless communication method is applicable to the wireless communication system according to implementations of the disclosure. The method includes the following.

S1010, a second control device transmits a first synchronization signal.

The first synchronization signal can provide synchronization information of all communication sub-systems in a wireless communication system.

Specifically, the second control device is a primary control device.

Specifically, the second control device can transmit the first synchronization signal on a target carrier. It should be noted that, the target carrier can be a preset frequency-band range. It is understandable that a first control device in the wireless communication system can receive the first synchronization signal in the preset frequency-band range.

Specifically, the first synchronization signal can include a first primary-synchronization-signal and a first secondary-synchronization-signal. It is understandable that the second control device transmits the first primary-synchronization-signal and the first secondary-synchronization-signal.

Furthermore, the first primary-synchronization-signal can carry a first ID, the first secondary-synchronization-signal can carry a second ID. A synchronization ID in the synchronization information can be uniquely determined according to the first ID and the second ID. Similarly, the first ID and the second ID can be determined according to the synchronization ID in the synchronization information. That is to say, when the first control device receives the first ID in the primary synchronization signal and the second ID in the secondary synchronization signal, the first control device can determine the synchronization ID according to the first ID and the second ID. Alternatively, when the first control device receives the synchronization ID in the synchronization information, the first control device can determine the first ID in the primary synchronization signal and the second ID in the secondary synchronization signal according to the synchronization ID.

Furthermore, the first ID, the second ID, and the synchronization ID are unrelated to communication sub-systems in the wireless communication system. That is to say, the first ID and the second ID can be determined by the second control device, can be pre-configured, or determined by the primary control device according to a vehicle ID. Similarly, the synchronization ID can be determined by the second control device, can be pre-configured, or can be determined by the primary control device according to a vehicle ID.

S1020, the first control device receives the first synchronization signal.

The first control device is one of at least one secondary control device. A communication sub-system to which the first control device belongs is different from a communication sub-system to which the second control device belongs. For example, in FIG. 1, the first control device is a secondary control device 1201, and the communication sub-system to which the secondary control device 1201 belongs is communication sub-system 12, while the communication sub-system to which the second control device 110 belongs is a communication sub-system 11.

Specifically, the first synchronization signal can include the first primary-synchronization-signal and the first secondary-synchronization-signal.

Furthermore, the first primary-synchronization-signal can carry the first ID, and the first secondary-synchronization-signal can carry the second ID.

Furthermore, the synchronization information contains the synchronization ID. It is understandable that the first control device can determine the synchronization ID according to the first ID in the first primary-synchronization-signal and the second ID in the secondary-synchronization-signal.

Specifically, the first control device can receive the first synchronization signal on the target carrier.

Furthermore, before S1020, the first control device can determine the target carrier according to pre-configured information.

Specifically, after S1020, the first control device can receive the first synchronization signal according to the pre-configured synchronization ID. It should be noted that, for secondary control devices which last for a long time in the same vehicle, for example, the microphone, loudspeaker, rearview mirror camera, and other secondary control devices in the vehicle do not need frequent replacement, and such secondary control device can receive the first synchronization signal according to the pre-configured synchronization ID. For secondary control devices other than the above secondary control devices, the first synchronization signal can be received according to all possible synchronization ID values, which is not limited herein.

S1030, the first control device determines synchronization information of a first system to which the first control device belongs according to the first synchronization signal.

Specifically, the synchronization information includes at least one of: a synchronization ID, a start of a superframe, an index of a superframe, a start of a frame, or an index of a frame.

Specifically, the first system is a communication subsystem formed by the first control device and at least one terminal controlled by the first control device. In the first system, the first control device can transmit a synchronization signal and a PBCH to at least one terminal in the first system, and can schedule transmission resource as well as forward data for the at least one terminal. It should be noted that, the first system may represent one communication sub-system.

As can be seen, in implementations of the disclosure, the second control device in the wireless communication system transmits the synchronization signal to at least one first control device in the wireless communication system. The synchronization signal provides synchronization information of at least one communication sub-system in the wireless communication system. Since the at least one first control device is located in the at least one communication sub-system, one of the at least one first control device can obtain synchronization information of a communication sub-system to which the control device belongs by receiving the synchronization signal, to synchronize with the second control device. Furthermore, instead of transmitting synchronization signals separately for one or more communication systems, the second control device transmits the synchronization signal to all first control devices in the at least one communication sub-system in the wireless communication system at the same time and therefore, the at least one communication sub-system can receive the synchronization signal in a common frequency-band range to achieve synchronization of a corresponding communication sub-system, which is conductive to reducing the bandwidth resource occupied by the second control device for transmitting synchronization signals, and is conducive to simplifying the deployment complexity of the entire wireless communication system.

Figure 11:
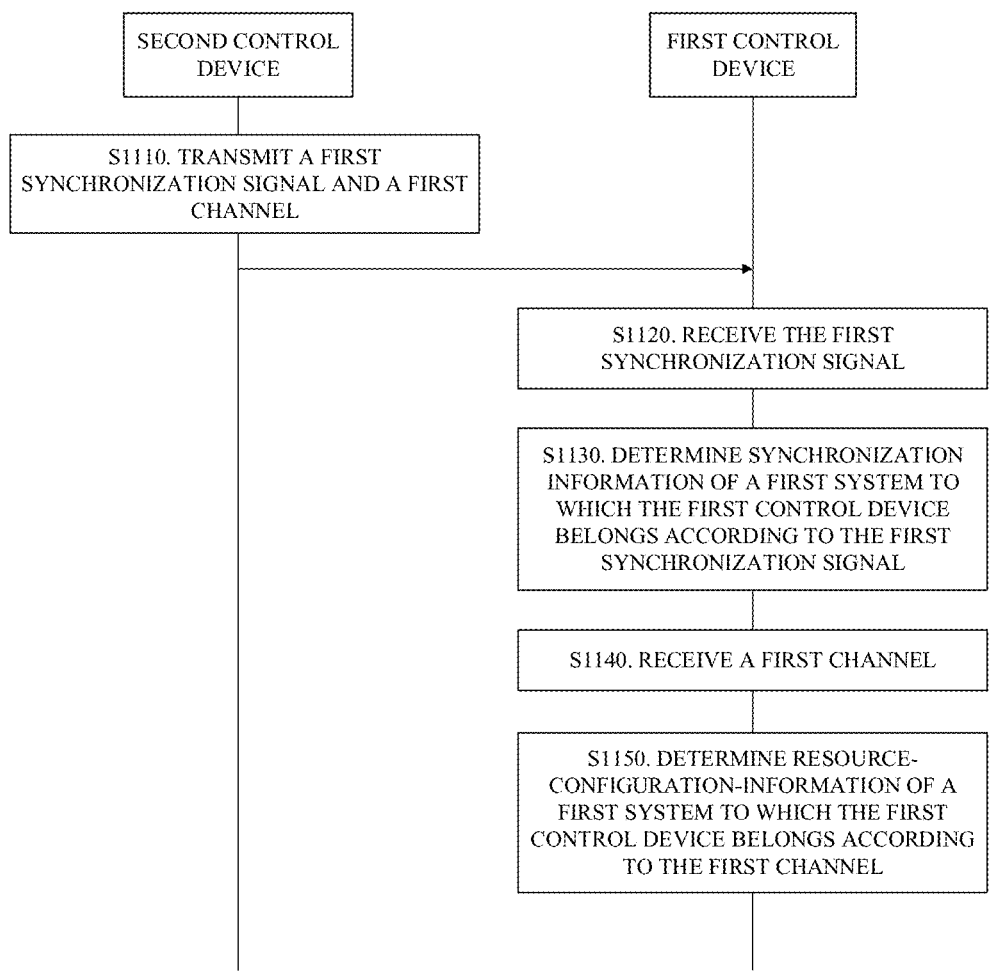
FIG. 11 is a schematic flowchart of a wireless communication method provided in implementations of the disclosure.

Consistent with the above implementation, for the above "communication scenario 1", "communication scenario 2", "communication scenario 3", or "communication scenario 4", another wireless communication method is provided in implementations of the disclosure, FIG. 11 is a flowchart of the method. The wireless communication method is applicable to the wireless communication system according to implementations of the disclosure. The method includes the following.

S1110, a second control device transmits a first synchronization signal and a first channel.

The first synchronization signal can provide synchronization information of all communication sub-systems in a wireless communication system, the first channel can indicate resource configuration information of all communication sub-systems in the wireless communication system directly or indirectly.

Specifically, the second control device is a primary control device.

Specifically, the second control device can transmit the first synchronization signal on a target carrier. It should be noted that, the target carrier can be a pre-configured frequency-band range. It is understandable that a first control device in the wireless communication system can receive the first synchronization signal in the pre-configured frequency-band range.

Specifically, the first synchronization signal can include a first primary-synchronization-signal and a first secondary-synchronization-signal. It is understandable that the second control device transmits the first primary-synchronization-signal and the first secondary-synchronization-signal.

Furthermore, the first primary-synchronization-signal can carry a first ID, the first secondary-synchronization-signal can carry a second ID. A synchronization ID in the synchronization information can be uniquely determined according to the first ID and the second ID. Similarly, the first ID and the second ID can be determined according to the synchronization ID in the synchronization information. That is to say, when the first control device or a terminal receives the first ID in the primary synchronization signal and the second ID in the secondary synchronization signal, the first control device or the terminal can determine the synchronization ID according to the first ID and the second ID. Alternatively, when the first control device or the terminal receives the synchronization ID in the synchronization information, the first control device or the terminal can determine the first ID in the primary synchronization signal and the second ID in the secondary synchronization signal according to the synchronization ID.

Furthermore, the first ID, the second ID, and the synchronization ID are unrelated to communication sub-systems in the wireless communication system. That is to say, the first ID and the second ID can be determined by the second control device, can be pre-configured, or determined by the primary control device according to a vehicle ID. Similarly, the synchronization ID can be determined by the second control device, can be pre-configured, or can be determined by the primary control device according to a vehicle ID.

Specifically, a number of bits occupied by the first channel relates to a number of secondary control devices associated with the second control device. It should be noted that, the number of secondary control devices associated with the second control device can be understood as how many secondary control devices are controlled by the second control device. For example, in FIG. 1, the secondary control devices associated with the second control device 110 include secondary control device 1201, secondary control device 1202, etc. Still another example, if no secondary control device is associated with the second control device, then the number of bits occupied by the first channel is N; if one secondary control node is associated with the second control device, the number of bits occupied by the first channel is N+M; if two secondary control nodes are associated with the second control device, the number of bits occupied by the first channel is N+M+L, and so on. Where N, M, and L are specific values, and M and L may have the same value or different values.

Specifically, the number of bits occupied by the first channel may be indicated by the first synchronization signal. It is understandable that, the first synchronization signal carries indication information indicative of the number of bits occupied by the first channel. The indication information can be carried in the first primary-synchronization-signal, in the first secondary-synchronization-signal, or in the first primary-synchronization-signal and the first secondary-synchronization-signal, which is not limited herein.

Specifically, the number of bits occupied by the first channel is determined by the number of communication sub-systems in the wireless communication system, and the number of communication sub-systems in the wireless communication system is indicated by the first synchronization signal. It is understandable that the first synchronization signal carries indication information indicative of the number of communication sub-systems in the wireless communication system. The indication information can be carried in the first primary-synchronization-signal, in the first secondary-synchronization-signal, or in the first primary-synchronization-signal and the first secondary-synchronization-signal, which is not limited herein. For example, in FIG. 1, the wireless communication system 10 includes a communication sub-system 11, a communication sub-system 12, and a communication sub-system 13, here, the first synchronization signal indicates that the number of communication sub-systems is three. Since each communication sub-system has one secondary control device or second control device, it is possible to determine the number of secondary control devices associated with the second control device according to the number of communication sub-systems, similar to the above.

A time-frequency resource location of the first synchronization signal and a time-frequency resource location of the first channel are in a preset relationship. It should be noted that, since the first synchronization signal can include the first primary-synchronization-signal and the first secondary-synchronization-signal, or include the first primary-synchronization-signal only, it may be that a time-frequency resource location of the first primary-synchronization-signal and the time-frequency resource location of the first channel are in a preset relationship, a time-frequency resource location of the first secondary-synchronization-signal and the time-frequency resource location of the first channel are in a preset relationship, or both the time-frequency resource location of the first primary-synchronization-signal and the time-frequency resource location of the first secondary-synchronization-signal and the time-frequency resource location of the first channel are in a preset relationship. For example, the first channel may occupy a preset number of subcarriers in one or more orthogonal frequency division multiplexing (OFDM) symbols preceding the OFDM symbol where the first primary-synchronization-signal is located; occupy a preset number of subcarriers in one or more OFDM symbols subsequent to the OFDM symbol where the first primary-synchronization-signal is located; occupy a preset number of subcarriers in the OFDM symbol where the first primary-synchronization-signal is located; occupy a preset number of subcarriers in one or more OFDM symbols preceding the OFDM symbol where the first secondary-synchronization-signal is located; occupy a preset number of subcarriers in one or more OFDM symbols subsequent to the OFDM symbol where the first secondary-synchronization-signal is located; or occupy a preset number of subcarriers in the OFDM symbol where the first secondary-synchronization-signal is located.

As can be seen, since the time-frequency resource location of the first synchronization signal and the time-frequency resource location of the first channel are in a preset relationship, when the time-frequency resource location of the first synchronization signal is known to the first control device or the terminal, the first control device or the terminal can determine the time-frequency resource location of the first channel according to the preset relationship.

Figure 12:
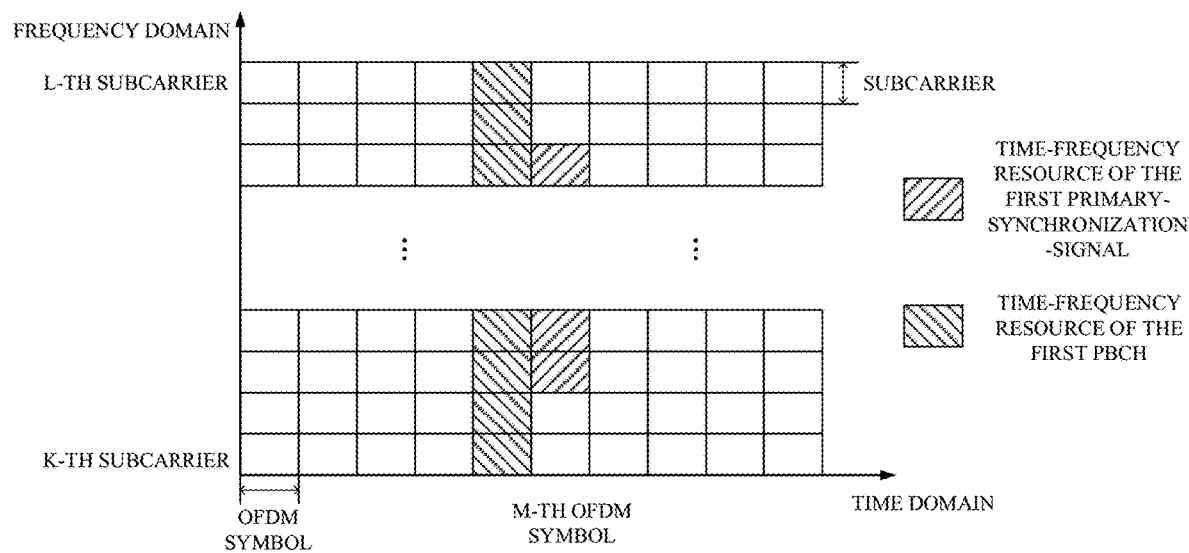
FIG. 12 is a schematic structural diagram of a time-frequency domain resource provided in implementations of the disclosure.

For example, as illustrated in FIG. 12, the time-domain resource location of the first primary-synchronization-signal occupies the M-th OFDM symbol in time domain and occupies multiple subcarriers in frequency domain. According to the preset relationship, the time-domain resource location of the first channel occupies one OFDM symbol preceding the M-th OFDM symbol in time domain and occupies multiple sub-carries in frequency domain.

Specifically, the first channel carries first information and at least one second information. The first information can be applied to a communication sub-system to which the second control device belongs and a communication sub-system to which the at least one secondary control device belongs. The second information can be applied to a communication sub-system to which the second control device belongs or a communication sub-system to which one of the at least one secondary control device belongs.

Figure 13:
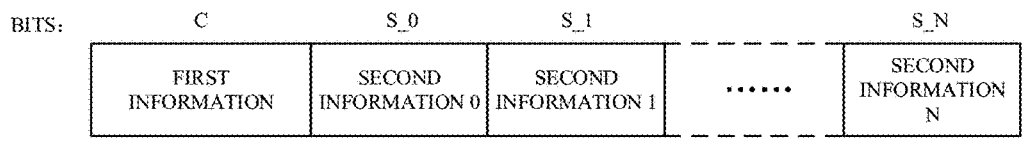
FIG. 13 is a schematic structural diagram of information carried by a physical broadcast channel (PBCH) provided in implementations of the disclosure.

For example, reference is made to FIG. 13, the first channel carries first information, second information 0, second information 1, and second information n and so on. The first information is common information which is applicable to all communication sub-systems in the wireless communication system. The second information 0 is specific information which is applicable to the communication sub-system to which the second control device belongs. The second information 1 is specific information which is applicable to a communication sub-system to which one secondary control device belongs. The second information n is specific information which is applicable to a communication sub-system to which another secondary control device belongs. Still another example, in combination with FIG. 1 and FIG. 12, the first channel carries first information, second information 0, second information 1, and second information 2. The first information is common information which is applicable to the communication sub-system 11, the communication sub-system 12, and the communication sub-system 13. The second information 0 is specific information which is applicable to the communication sub-system 11, the second information 1 is specific information which is applicable to the communication sub-system 12, the second information 2 is specific information which is applicable to the communication sub-system 13.

Furthermore, the first information may include at least one of: subcarrier spacing and system frame number. The second information may include at least one of: a communication sub-system ID, and scheduling information for communication sub-system dedicated transmission information.

For example, in combination with FIG. 1 and FIG. 13, the first information contains subcarrier spacing configured by the communication sub-system 11, the communication sub-system 12, and the communication sub-system 13. The second information contains the communication sub-system ID of the communication sub-system 11.

Furthermore, the number of bits occupied by the first information is a first bit number, and the number of bits occupied by the second information is a second bit number. The first bit number and the second bit number are pre-configured. The value of the first bit number may be the same as or different from the value of the second bit number.

For example, in FIG. 13, the number of bits occupied by the first information is C, the number of bits occupied by the second information 0 is S_0, the number of bits occupied by the second information 1 is S_1, the number of bits occupied by the second information 2 is S_2, and the number of bits occupied by the second information n is S_n.

Furthermore, the second bit number is determined by the communication sub-system to which the second control device belongs or the communication sub-system to which one of the at least one secondary control device belongs. That is to say, the number of bits corresponding to the communication sub-system to which the second control device belongs can be the same as or different from the number of bits corresponding to other communication sub-systems, and the number of bits corresponding to each of the other communication sub-systems can be the same of different.

For example, in combination with FIG. 1 and FIGS. 13, S_0 and S_1 (S_2) may have the same value or different values, and S_1 and S_2 may have the same value or different values.

Specifically, the first channel may include a physical broadcast channel (PBCH).

S1120, the first control device receives the first synchronization signal.

The first control device is one of the at least one secondary control device. The communication sub-system to which the first control device belongs is different from the communication sub-system to which the second control device belongs. For example, in FIG. 1, the first control device is the secondary control device 1201, and the secondary control device 1201 belongs to the communication sub-system 12, while the second control device 110 belongs to the communication sub-system 11.

Specifically, the first control device can receive the first synchronization signal on a target carrier. It should be noted that, the first control device can receive the first synchronization signal on the target carrier as follows, the first control device can detect the first synchronization signal on the target carrier, listen the first synchronization signal on the target carrier, or perform blind-detection on the first synchronization signal on the target carrier and so on, which is not limited herein.

Furthermore, before S1120, the first control device can determine the target carrier according to pre-configured information.

After S1120, the first control device can receive the first synchronization signal according to a pre-configured synchronization ID. It should be noted that, for secondary control devices which last for a long time in the same vehicle, for example, the microphone, loudspeaker, rearview mirror camera, and other secondary control devices in the vehicle do not need frequent replacement, and such secondary control device can receive the first synchronization signal according to the pre-configured synchronization ID. For secondary control devices other than the above secondary control devices, the first synchronization signal can be received according to all possible synchronization ID values, which is not limited herein.

S1130, the first control device determines synchronization information of a first system to which the first control device belongs according to the first synchronization signal.

Specifically, the first system is a communication sub-system formed by the first control device and at least one terminal controlled by the first control device. In the first system, the first control device can transmit a synchronization signal and a PBCH to at least one terminal in the first system, and can schedule transmission resource as well as forward data for the at least one terminal. It should be noted that, the first system can be represented as one communication sub-system.

Specifically, the synchronization information contains a synchronization ID. It can be understood that, the first control device can determine the synchronization ID according to the first ID in the first primary-synchronization-signal and the second ID in the secondary synchronization-signal.

Specifically, the synchronization information may contain at least one of: a synchronization ID, a start of a superframe, an index of a superframe, a start of a frame, or an index of a frame.

S1140, the first control device receives a first channel.

Specifically, before S1140, the first control device can determine a time-frequency resource location of the first channel according to a time-frequency resource location of the first synchronization signal. It should be noted that, since the first synchronization signal can include a first primary-synchronization-signal and a secondary-synchronization-signal, the first control device can determine the time-frequency resource location of the first channel according to a time-frequency resource location of the first primary-synchronization-signal, determine the time-frequency resource location of the first channel according to a time-frequency resource location of the first secondary-synchronization-signal, or determine the time-frequency resource location of the first channel according to the time-frequency resource location of the first primary-synchronization-signal and the time-frequency resource location of the first secondary-synchronization-signal, which is similar to the above statement that "a time-frequency resource location of the first synchronization signal and a time-frequency resource location of the first channel are in a preset relationship" and will not be repeated.

S1150, the first control device determines first resource-configuration-information of a first system to which the first control device belongs according to the first channel.

The following describes two manners for the first control device to determine the first resource-configuration-information.

Manner 1:

The first control device obtains directly the first resource-configuration-information according to the first information and the second information carried by the first channel. The first information and the second information are described above and will not be repeated here.

Specifically, the first control device obtains the first resource-configuration-information of the communication sub-system to which the first control device belongs by receiving the first channel, which includes: the first control device receives the first channel to obtain the first information and the second information, and the first control device obtains the first resource-configuration-information according to the first information and the second information.

Specifically, the first resource-configuration-information may include at least one of: a subcarrier spacing, a system frame number, a communication sub-system ID, and scheduling information for communication sub-system dedicated transmission information.

Manner 2:

The first control device obtains scheduling information for system broadcast information through the first channel, and obtains related resource configuration information by reading the system broadcast information. The system broadcast information is transmitted by the second control device, and the system broadcast information can carry information indicative of related resource configuration of all communication sub-systems in the wireless communication system. Furthermore, the first channel can carry scheduling information indicating the system broadcast information. The scheduling information can include a transmission period (that is, periodicity) of the system broadcast information, a time offset in each period, a time-frequency resource location of the system broadcast information, etc.

Specifically, the first control device determines the first resource-configuration-information of the communication sub-system to which the first control device belongs according to the first channel received, as follows: the first control device receives the scheduling information for the system broadcast information, which is obtained by the first control device according to the first channel; the first control device obtains the first resource-configuration-information by reading, according to the scheduling information, the system broadcast information transmitted by the second control device.

Furthermore, the system broadcast information may include a system information block (SIB).

It should be noted that, the technical scheme of the implementation illustrated in FIG. 11 is consistent with part of the technical scheme of the implementation illustrated in FIG. 10, and for those skilled in the art, for details of the technical scheme of the implementation illustrated in FIG. 11, reference can be made to the technical scheme of the implementation illustrated in FIG. 10, which will not be repeated herein again.

As can be seen, in implementations of the disclosure, the second control device in the wireless communication system transmits on the target carrier the first synchronization signal and the first channel to at least one first control device in the wireless communication system. The first synchronization signal provides synchronization information of at least one communication sub-system in the wireless communication system, and the first channel indicates resource configuration information of at least one communication sub-system in the wireless communication system. Since the at least one first control device is located in the at least one communication sub-system, one of the at least one first control device can obtain the synchronization information and the related resource configuration information of the communication sub-system to which the first control device belongs by receiving the first synchronization signal and the first channel, to establish an initial connection between the second control device and the first control device. Furthermore, instead of transmitting the synchronization signal and the first channel to one or more communication systems separately, the second control device transmits the synchronization signal and the first channel to all first control devices in the at least one communication sub-system in the wireless communication system and therefore, the at least one communication sub-system receives the synchronization signal and the first channel in a common frequency-band range to achieve synchronization and related resource configuration thereof, which is conductive to reducing the frequency-band resource occupied by the second control device for transmitting the synchronization signal and the first channel and conductive to simplifying the deployment complexity of the entire wireless communication system.

Figure 14:
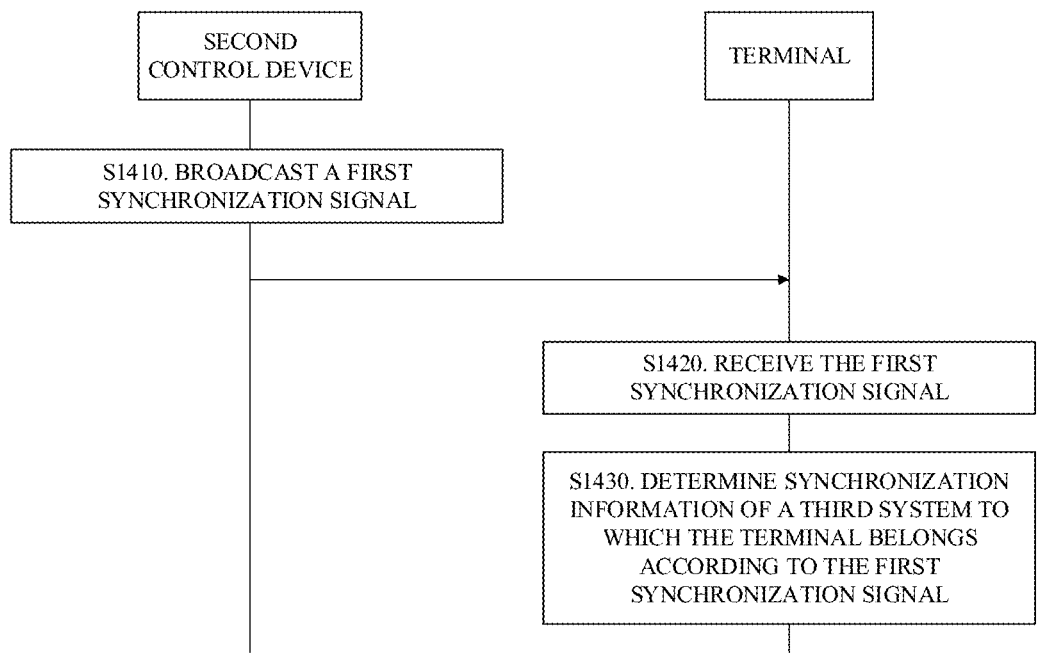
FIG. 14 is a schematic flowchart of another wireless communication method provided in implementations of the disclosure.

Consistent with the above implementation, for the above "communication scenario 1", "communication scenario 2", "communication scenario 3", or "communication scenario 4", another wireless communication method is provided in implementations of the disclosure, FIG. 14 is a flowchart of the method. The wireless communication method is applicable to the wireless communication system according to implementations of the disclosure. The method includes the following.

S1410, a second control device transmits a first synchronization signal.

The first synchronization signal can provide synchronization information of all communication sub-systems in a wireless communication system.

Specifically, the second control device can transmit the first synchronization signal on a target carrier. It should be noted that, the target carrier can be a pre-configured frequency-band range. It can be understood that, a terminal in the wireless communication system can receive the first synchronization signal in the pre-configured frequency-band range.

Specifically, the first synchronization signal can include a first primary-synchronization-signal and a first secondary-synchronization-signal. It can be understood that, the second control device transmits the first primary-synchronization-signal and the first secondary-synchronization-signal.

Furthermore, the first primary-synchronization-signal can carry a first ID, and the first secondary-synchronization-signal can carry a second ID. A synchronization ID in synchronization information can be uniquely determined according to the first ID and the second ID. Similarly, the first ID and the second ID can be determined according to the synchronization ID in the synchronization information. That is to say, when the terminal receives the first ID in the primary synchronization signal and the second ID in the secondary synchronization signal, a first control device can determine the synchronization ID according to the first ID and the second ID. Alternatively, when the terminal receives the synchronization ID in the synchronization information, the first control device can determine the first ID in the primary synchronization signal and the second ID in the secondary synchronization signal according to the synchronization ID.

Furthermore, the first ID, the second ID, and the synchronization ID are unrelated to communication sub-systems in the wireless communication system. That is to say, the first ID and the second ID can be determined by the second control device, can be pre-configured, or determined by the primary control device according to a vehicle ID. Similarly, the synchronization ID can be determined by the second control device, can be pre-configured, or can be determined by the primary control device according to a vehicle ID.

S1420, the terminal receives the first synchronization signal.

It should be noted that, the controlled device in implementations of the disclosure can be the terminal. A communication sub-system to which the terminal belongs can be the same as or different from a communication sub-system to which the second control device belongs. For example, in FIG. 1, the terminal can be a controlled device 1301 and belongs to the same communication sub-system as the second control device 110. The terminal can be a controlled device 1304 and does not belong to the same communication sub-system as the second control device 110.

Specifically, the first synchronization signal can include a first primary-synchronization-signal and a first secondary-synchronization-signal.

Furthermore, the first primary-synchronization-signal can carry a first ID, the first secondary-synchronization-signal can carry a second ID.

Furthermore, synchronization information includes a synchronization ID. It can be understood that, the terminal can determine the synchronization ID according to the first ID in the first primary-synchronization-signal and the second ID in the secondary synchronization signal.

Specifically, the terminal can receive the first synchronization signal on a target carrier.

Furthermore, before S1420, the terminal can determine the target carrier according to pre-configured information.

Specifically, after S1420, the terminal can receive the first synchronization signal according to a pre-configured synchronization ID. It should be noted that, for controlled devices which last for a long time in the same vehicle, for example, the microphone, loudspeaker, rearview mirror camera, and other secondary control devices in the vehicle do not need frequent replacement, the terminal can receive the first synchronization signal according to the pre-configured synchronization ID. For terminals other than the above terminals, the first synchronization signal can be received according to all possible synchronization ID values, which is not limited herein.

S1430, the terminal determines synchronization information of a third system to which the terminal belongs according to the first synchronization signal.

Specifically, the synchronization information may contain at least one of: a synchronization ID, a start of a superframe, an index of a superframe, a start of a frame, or an index of a frame.

Specifically, the third system is a communication sub-system where the terminal is located. In a communication sub-system to which the first control device belongs, the first control device can transmit data to other terminals in the communication sub-system.

As can be seen, in implementations of the disclosure, the second control device in the wireless communication system transmits the synchronization signal to at least one terminal in the wireless communication system. The synchronization signal provides synchronization information of at least one communication sub-system in the wireless communication system. Since the at least one terminal is located in the at least one communication sub-system, one of the at least one terminal can obtain the synchronization information of the communication sub-system to which the terminal belongs by receiving the synchronization signal, to achieve synchronization between the second control device and the terminal. Furthermore, instead of transmitting the synchronization signal to one or more communication systems separately, the second control device transmits the synchronization signal to all terminals in the at least one communication sub-system in the wireless communication system and therefore, the at least one communication sub-system receives the synchronization signal in a common frequency-band range to achieve synchronization thereof, which is conductive to reducing the frequency-band resource occupied by the second control device for transmitting the synchronization signal and conductive to simplifying the deployment complexity of the entire wireless communication system.

Figure 15:
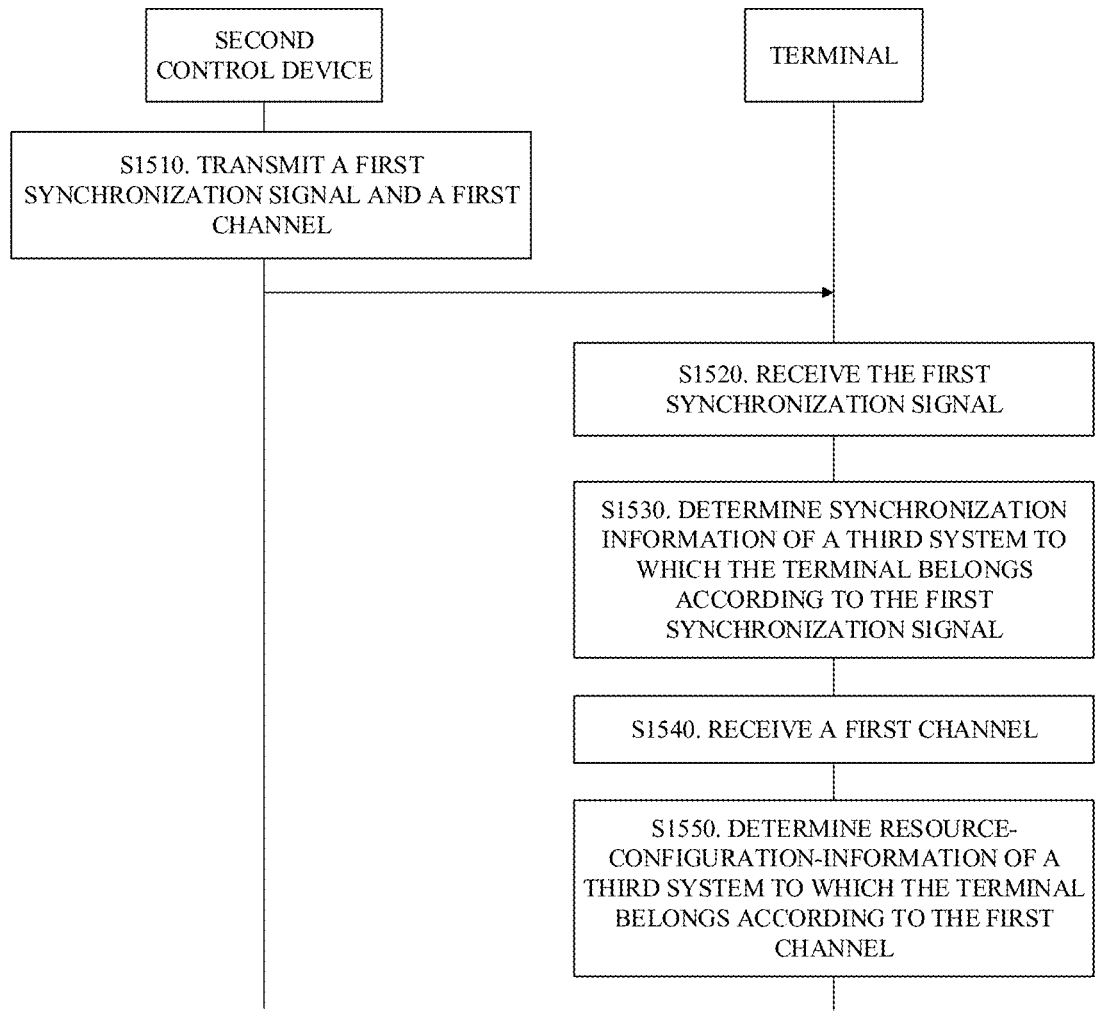
FIG. 15 is a schematic flowchart of another wireless communication method provided in implementations of the disclosure.

Consistent with the above implementation, for the above "communication scenario 1", "communication scenario 2", "communication scenario 3", or "communication scenario 4", another wireless communication method is provided in implementations of the disclosure, FIG. 15 is a flowchart of the method. The wireless communication method is applicable to the wireless communication system according to implementations of the disclosure. The method includes the following.

S1510, a second control device transmits a first synchronization signal and a first channel.

The first synchronization signal can provide synchronization information of all communication sub-systems in a wireless communication system, the first channel can indicate resource configuration information of all communication sub-systems in the wireless communication system directly or indirectly.

Specifically, the second control device can transmit the first synchronization signal on a target carrier. It should be noted that, the target carrier can be a pre-configured frequency-band range. It is understandable that a first control device in the wireless communication system can receive the first synchronization signal in the pre-configured frequency-band range.

Specifically, the first synchronization signal received by the terminal can include a first primary-synchronization-signal and a first secondary-synchronization-signal. It is understandable that the second control device transmits the first primary-synchronization-signal and the first secondary-synchronization-signal on the target carrier.

Furthermore, the first primary-synchronization-signal can carry a first ID, the first secondary-synchronization-signal can carry a second ID.

Specifically, the first channel includes a PBCH.

S1520, the terminal receives the first synchronization signal.

It should be noted that, the controlled device in implementations of the disclosure can be the terminal. A communication sub-system to which the terminal belongs can be the same as or different from a communication sub-system to which the second control device belongs. For example, in FIG. 1, the terminal can be a controlled device 1301 and belongs to the same communication sub-system as the second control device 110. The terminal can be a controlled device 1304 and does not belong to the same communication sub-system as the second control device 110.

Specifically, the terminal can receive the first synchronization signal on the target carrier.

Furthermore, before S1520, the terminal can determine the target carrier according to pre-configured information.

Specifically, after S1520, the terminal can receive the first synchronization signal according to a pre-configured synchronization ID.

S1530, the terminal determines synchronization information of a third system to which the terminal belongs according to the first synchronization signal.

Specifically, the synchronization information includes a synchronization ID. It is understandable that the terminal can determine the synchronization ID according to a first ID in a first primary-synchronization-signal and a second ID in a secondary synchronization signal.

Specifically, the synchronization information may contain at least one of: a synchronization ID, a start of a superframe, an index of a superframe, a start of a frame, or an index of a frame.

S1540, the terminal receives a first channel.

Specifically, before S1540, the terminal can determine a time-frequency resource location of the first channel according to a time-frequency resource location of the first synchronization signal. It should be noted that, since the first synchronization signal can include the first primary-synchronization-signal and the secondary-synchronization-signal, the first control device can determine the time-frequency resource location of the first channel according to a time-frequency resource location of the first primary-synchronization-signal, determine the time-frequency resource location of the first channel according to a time-frequency resource location of the first secondary-synchronization-signal, or determine the time-frequency resource location of the first channel according to the time-frequency resource location of the first primary-synchronization-signal and the time-frequency resource location of the first secondary-synchronization-signal, which is similar to the above statement that "a time-frequency resource location of the first synchronization signal and a time-frequency resource location of the first channel are in a preset relationship" and will not be repeated.

S1550, the terminal determines first resource-configuration-information of a third system to which the terminal belongs according to the first channel.

Specifically, before S1330, the terminal can determine the time-frequency resource location of the first channel according to the time-frequency resource location of the first synchronization signal.

The following describes two manners for the terminal to determine the first resource-configuration-information.

Manner 1:

The terminal obtains the first resource-configuration-information according to first information and second information carried by the first channel. The first information and the second information are similar to those described with reference to FIG. 10 and will not be repeated here.

Specifically, the terminal obtains the first resource-configuration-information of the communication sub-system to which the terminal belongs by receiving the first channel, which includes: the terminal receives the first channel to obtain the first information and the second information, and the terminal obtains the first resource-configuration-information according to the first information and the second information.

The first resource-configuration-information may include at least one of: a subcarrier spacing, a system frame number, a communication sub-system ID, and scheduling information for communication sub-system dedicated broadcast information.

Manner 2:

The terminal obtains scheduling information for system broadcast information through the first channel, and obtains related resource configuration information by reading the system broadcast information. The system broadcast information is transmitted by the second control device, and the system broadcast information can carry information indicative of related resource configuration of all communication sub-systems in the wireless communication system. Furthermore, the first channel can carry scheduling information indicating the system broadcast information. The scheduling information can include a transmission period (that is, periodicity) of the system broadcast information, a time offset in each period, a time-frequency resource location of the system broadcast information, etc.

Specifically, the terminal determines first resource-configuration-information of the communication sub-system to which the terminal belongs according to the first channel received, as follows: the terminal receives the scheduling information for the system broadcast information, which is obtained by the terminal according to the first channel; the terminal obtains the first resource-configuration-information by reading, according to the scheduling information, the system broadcast information transmitted by the second control device.

Furthermore, the system broadcast information may include a system information block (SIB).

It should be noted that, the technical scheme of the implementation illustrated in FIG. 15 is consistent with part of the technical schemes of the implementations illustrated in FIG. 10, FIG. 11, or FIG. 14, and for those skilled in the art, for details of the technical scheme of the implementation illustrated in FIG. 13, reference can be made to the technical scheme of the implementation illustrated in FIG. 10, FIG. 11, or FIG. 14, which will not be repeated herein again.

As can be seen, in implementations of the disclosure, the second control device in the wireless communication system transmits on the target carrier the first synchronization signal and the first channel to at least one terminal in the wireless communication system. The first synchronization signal provides synchronization information of at least one communication sub-system in the wireless communication system, and the first channel indicates resource configuration information of at least one communication sub-system in the wireless communication system. Since the at least one terminal is located in the at least one communication sub-system, one of the at least one terminal can obtain the synchronization information and the related resource configuration information of the communication sub-system to which the terminal belongs by receiving the first synchronization signal and the first channel, to establish an initial connection between the second control device and the terminal. Furthermore, instead of transmitting the synchronization signal and the first channel to one or more communication systems separately, the second control device transmits the synchronization signal and the first channel to all terminals in the at least one communication sub-system in the wireless communication system and therefore, the at least one communication sub-system receives the synchronization signal and the first channel in a common frequency-band range to achieve synchronization and related resource configuration thereof, which is conductive to reducing the frequency-band resource occupied by the second control device for transmitting the synchronization signal and the first channel and conductive to simplifying the deployment complexity of the entire wireless communication system.

Figure 16:
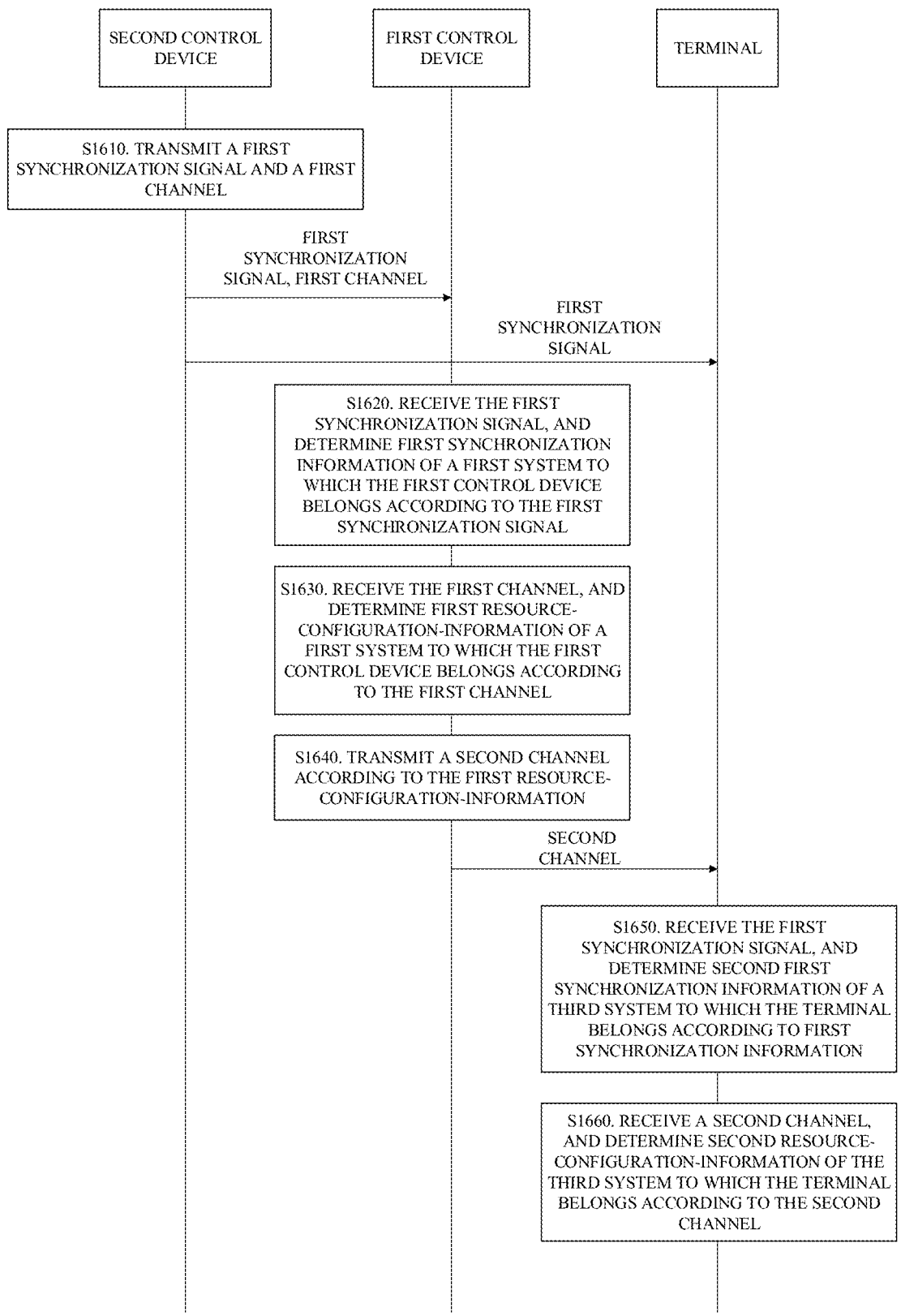
FIG. 16 is a schematic flowchart of another wireless communication method provided in implementations of the disclosure.

For the above "communication scenario 1", "communication scenario 2", "communication scenario 3", or "communication scenario 4", another wireless communication method is provided in implementations of the disclosure, FIG. 16 is a flowchart of the method. The wireless communication method is applicable to the wireless communication system according to implementations of the disclosure. The method includes the following.

S1610, a second control device transmits a first synchronization signal and a first channel.

Specifically, the second control device can transmit the first synchronization signal on a target carrier. It should be noted that, the target carrier can be a pre-configured frequency-band range. It is understandable that a first control device in a wireless communication system can receive the first synchronization signal in the pre-configured frequency-band range. The first synchronization signal received by the first control device can include a first primary-synchronization-signal and a first secondary-synchronization-signal. It can be understood that, the second control device transmits the first primary-synchronization-signal and the first secondary-synchronization-signal.

Furthermore, the first primary-synchronization-signal can carry a first ID, and the first secondary-synchronization-signal can carry a second ID.

Specifically, a time-frequency resource location of the first synchronization signal and a time-frequency resource location of the first channel are in a preset relationship.

Specifically, the first channel carries first information and at least one second information.

Furthermore, the first information includes indication information, the indication information indicates a time-frequency resource location of each of secondary control devices associated with the second control device when transmitting a PBCH. It can be understood that, the indication information indicates a time-frequency resource location of the first control device when transmitting a second channel. For example, in FIG. 1, secondary control devices associated with the second control device 110 include a secondary control device 1201, here, the PBCH transmitted by the second control device 110 carries information for indicating a time-frequency resource location of the secondary control device 1201 when transmitting the PBCH in a communication sub-system 12.

Specifically, the first channel includes a PBCH.

S1620, the first control device receives the first synchronization signal, and determines first synchronization information of a communication sub-system to which the first control device belongs according to the first synchronization signal.

The first control device is one of at least one secondary control device. A communication sub-system to which the first control device belongs is different from a communication sub-system to which the second control device belongs.

Specifically, the first synchronization information includes a synchronization ID. It can be understood that the first control device can determine the synchronization ID according to the first ID in the first primary-synchronization-signal and the second ID in the secondary synchronization signal.

Specifically, the first synchronization information may contain at least one of: a synchronization ID, a start of a superframe, an index of a superframe, a start of a frame, or an index of a frame.

Specifically, before S1620, the first control device can determine a target carrier according to pre-configured information.

Specifically, after S1620, the first control device can receive the first synchronization signal according to a pre-configured synchronization ID.

S1630, the first control device receives the first channel, and determines first resource-configuration-information of a first system to which the first control device belongs according to the first channel.

It should be noted that the two manners for the first control device to determine the first resource-configuration-information is consistent to the implementation of FIG. 11, which will not be repeated herein again.

Specifically, the first resource-configuration-information may include at least one of: a subcarrier spacing, indication information for indicating a time-frequency resource location of a second channel, a system frame number, a communication sub-system ID, and scheduling information for communication sub-system dedicated transmission information.

S1640, the first control device transmits a second channel according to the first resource-configuration-information.

Specifically, a time-frequency resource location of the first synchronization signal and a time-frequency resource location of the second channel are in a preset relationship. It should be noted that, since the first synchronization signal can include a first primary-synchronization-signal and a first secondary-synchronization-signal, or include the first primary-synchronization-signal only, it may be that a time-frequency resource location of the first primary-synchronization-signal and the time-frequency resource location of the second channel are in a preset relationship, a time-frequency resource location of the first secondary-synchronization-signal and the time-frequency resource location of the second channel are in a preset relationship, or the time-frequency resource location of the first primary-synchronization-signal and the time-frequency resource location of the first secondary-synchronization-signal and the time-frequency resource location of the second channel are in a preset relationship. For example, the second channel may occupy a preset number of subcarriers in one or more OFDM symbols preceding the OFDM symbol where the first primary-synchronization-signal is located, occupy a preset number of subcarriers in one or more OFDM symbols subsequent to the OFDM symbol where the first primary-synchronization-signal is located, occupy a preset number of subcarriers in the OFDM symbol where the first primary-synchronization-signal is located. The second channel may occupy a preset number of subcarriers in one or more OFDM symbols preceding the OFDM symbol where the first secondary-synchronization-signal is located, occupy a preset number of subcarriers in one or more OFDM symbols subsequent to the OFDM symbol where the first secondary-synchronization-signal is located, or occupy a preset number of subcarriers in the OFDM symbol where the first secondary-synchronization-signal is located.

As can be seen, since the time-frequency resource location of the first synchronization signal and the time-frequency resource location of the second channel are in the preset relationship, when the time-frequency resource location of the first synchronization signal is known to the first control device or the terminal, the first control device or the terminal can determine the time-frequency resource location of the second channel according to the preset relationship.

Figure 17:
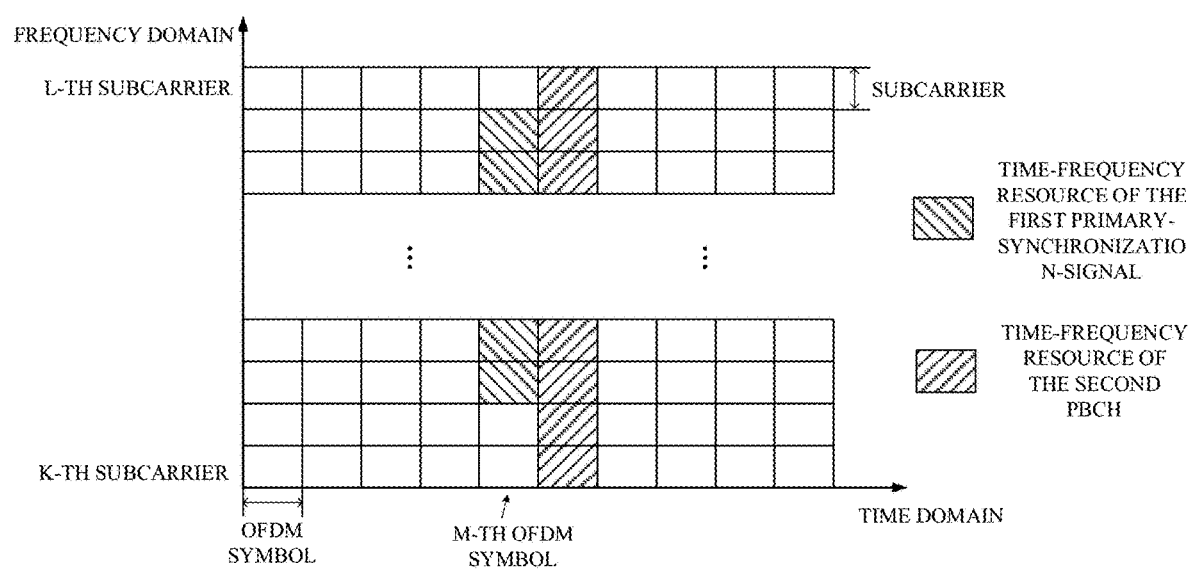
FIG. 17 is another schematic structural diagram of a time-frequency domain resource provided in implementations of the disclosure.

For example, refer to FIG. 17. A time-domain resource location of the first primary-synchronization-signal occupies the M-th OFDM symbol in time-domain and occupies multiple subcarriers in frequency-domain. According to the preset relationship, a time-domain resource location of the second channel occupies a OFDM symbol subsequent to the M-th OFDM symbol in time-domain and occupies multiple subcarriers in frequency-domain.

Specifically, the time-frequency resource location of the first channel and the time-frequency resource location of the second channel are in a preset relationship. It should be noted that, the second channel can occupy a preset number of subcarriers in one or more OFDM symbols preceding the OFDM symbol where the first channel is located, occupy a preset number of subcarriers in one or more OFDM symbols subsequent to the OFDM symbol where the first channel is located, or occupy a preset number of subcarriers in the OFDM symbol where the first channel is located.

As can be seen, since the time-frequency resource location of the first channel and the time-frequency resource location of the second channel are in the preset relationship, when the time-frequency resource location of the first channel is known to the first control device, the first control device can determine the time-frequency resource location of the second channel according to the preset relationship.

Specifically, the time-frequency resource location of the second channel can be indicated by the first channel, or the time-frequency resource location of the second channel can be determined as follows: the terminal obtains scheduling information for system broadcast information according to the second channel, and obtains the time-frequency resource location of the second channel by reading, according to the scheduling information, the system broadcast information transmitted by the first control device.

Specifically, the number of bits occupied by the second channel is a third number of bits. The third number of bits is indicated by the first channel or pre-configured.

Specifically, the number of bits occupied by the second channel can be indicated by the first synchronization signal.

S1650, the terminal receives the first synchronization signal, and determines second first synchronization information of a third system to which the terminal belongs according to first synchronization information.

It should be noted that, a communication sub-system to which the terminal belongs is the same as a communication sub-system to which the first control device belongs. For example, In FIG. 1, the first control device is a secondary control device 1201, the terminal is a controlled device 1304, therefore, the secondary control device 1201 and the controlled device 1304 are located in the same communication sub-system.

Specifically, the second synchronization information includes a synchronization ID. It can be understood that, the terminal can determine the synchronization ID according to a first ID in a first primary-synchronization-signal and a second ID in a secondary synchronization signal.

The second synchronization information may include at least one of: a synchronization ID, a start of a superframe, an index of a superframe, a start of a frame, or an index of a frame.

Specifically, before S1620, the terminal can determine a target carrier according to pre-configured information.

Specifically, after S1620, the terminal can receive the first synchronization signal according to a pre-configured synchronization ID.

S1660, the terminal receives a second channel, and determines second resource-configuration-information of the third system to which the terminal belongs according to the second channel.

Specifically, before S1660, the terminal can determine the time-frequency resource location of the second channel according to the time-frequency resource location of the first synchronization signal. It should be noted that, since the first synchronization signal can include a first primary-synchronization-signal and first secondary-synchronization-signal, the terminal can determine the time-frequency resource location of the second channel according to the time-frequency resource location of the first primary-synchronization-signal, determine the time-frequency resource location of the second channel according to the time-frequency resource location of the first secondary-synchronization-signal, or determine the time-frequency resource location of the second channel according to the time-frequency resource location of the first primary-synchronization-signal and the time-frequency resource location of the first secondary-synchronization-signal, which is similar to the above statement that "a time-frequency resource location of the first synchronization signal and a time-frequency resource location of a second channel are in a preset relationship", which will not be repeated herein.

The following describes two manners for the terminal to determine the second resource-configuration-information.

Manner 1:

The terminal obtains the second resource-configuration-information directly according to information carried by the second channel. The information carried by the second channel may include at least one of: a subcarrier spacing, a system frame number, a communication sub-system ID, and scheduling information for communication sub-system ID dedicated broadcast message.

Specifically, the second resource-configuration-information may include at least one of: a subcarrier spacing, a system frame number, a communication sub-system ID, and scheduling information for communication sub-system ID dedicated broadcast message.

Manner 2:

The terminal obtains scheduling information for system broadcast information through the second channel, and obtains related resource configuration information by reading the system broadcast information. The system broadcast information is transmitted by the first control device, and the system broadcast information can carry information indicative of related resource configuration of a communication sub-system to which the first control device belongs. Furthermore, the second channel can carry scheduling information indicating the system broadcast information. The scheduling information can include a transmission period (that is, periodicity) of the system broadcast information, a time offset in each period, a time-frequency resource location of the system broadcast information, etc.

Specifically, the terminal determines the second resource-configuration-information of the communication sub-system to which the terminal belongs according to the second channel received, as follows: the terminal receives the scheduling information for SIB system broadcast information, which is obtained by the terminal according to the second channel; the terminal obtains the second resource-configuration-information by reading, according to the scheduling information, the system broadcast information transmitted by the first control device.

Furthermore, the system broadcast information may include a SIB.

It should be noted that, the technical scheme of the implementation illustrated in FIG. 16 is consistent with part of the technical schemes of the implementations illustrated in FIG. 10, FIG. 11, FIG. 14, or FIG. 15, and for those skilled in the art, for details of the technical scheme of the implementation illustrated in FIG. 14, reference can be made to the technical scheme of the implementation illustrated in FIG. 10, FIG. 11, FIG. 14, or FIG. 15, which will not be repeated herein again.

As can be seen, in implementations of the disclosure, the second control device in the wireless communication system transmits on the target carrier the first synchronization signal and the first channel to at least one secondary control device in the wireless communication system, and transmits on the target carrier the first synchronization signal to at least one terminal. The first synchronization signal provides synchronization information of at least one communication sub-system in the wireless communication system, and the first channel indicates resource configuration information of at least one communication sub-system in the wireless communication system. Since the at least one secondary control device is located in the at least one communication sub-system, one of the at least one secondary control device can obtain the synchronization information and the related resource configuration information of the communication sub-system to which the secondary control device belongs by receiving the first synchronization signal and the first channel, to establish an initial connection between the second control device and the secondary control device. Furthermore, the at least one secondary control device transmits the second channel to at least one terminal according to the related resource configuration information, one of the at least one terminal obtains the synchronization information and the related resource configuration information of the communication sub-system to which the terminal belongs by receiving the first synchronization signal and the second channel, to establish an initial connection between the secondary control device and the terminal and an initial connection between the second control device and the terminal. Furthermore, instead of transmitting the synchronization signal and the first channel to one or more communication systems separately, the second control device transmits the synchronization signal and the first channel to all secondary control devices in the at least one communication sub-system in the wireless communication system and transmits the synchronization signal to all terminals and therefore, the at least one communication sub-system receives the synchronization signal and the first channel in a common frequency-band range to achieve synchronization and related resource configuration thereof, which is conducive to reducing the frequency-band resource occupied by the second control device or the secondary control device for transmitting the synchronization signal and/or the first channel and conductive to simplifying the deployment complexity of the entire wireless communication system.

Figure 18:
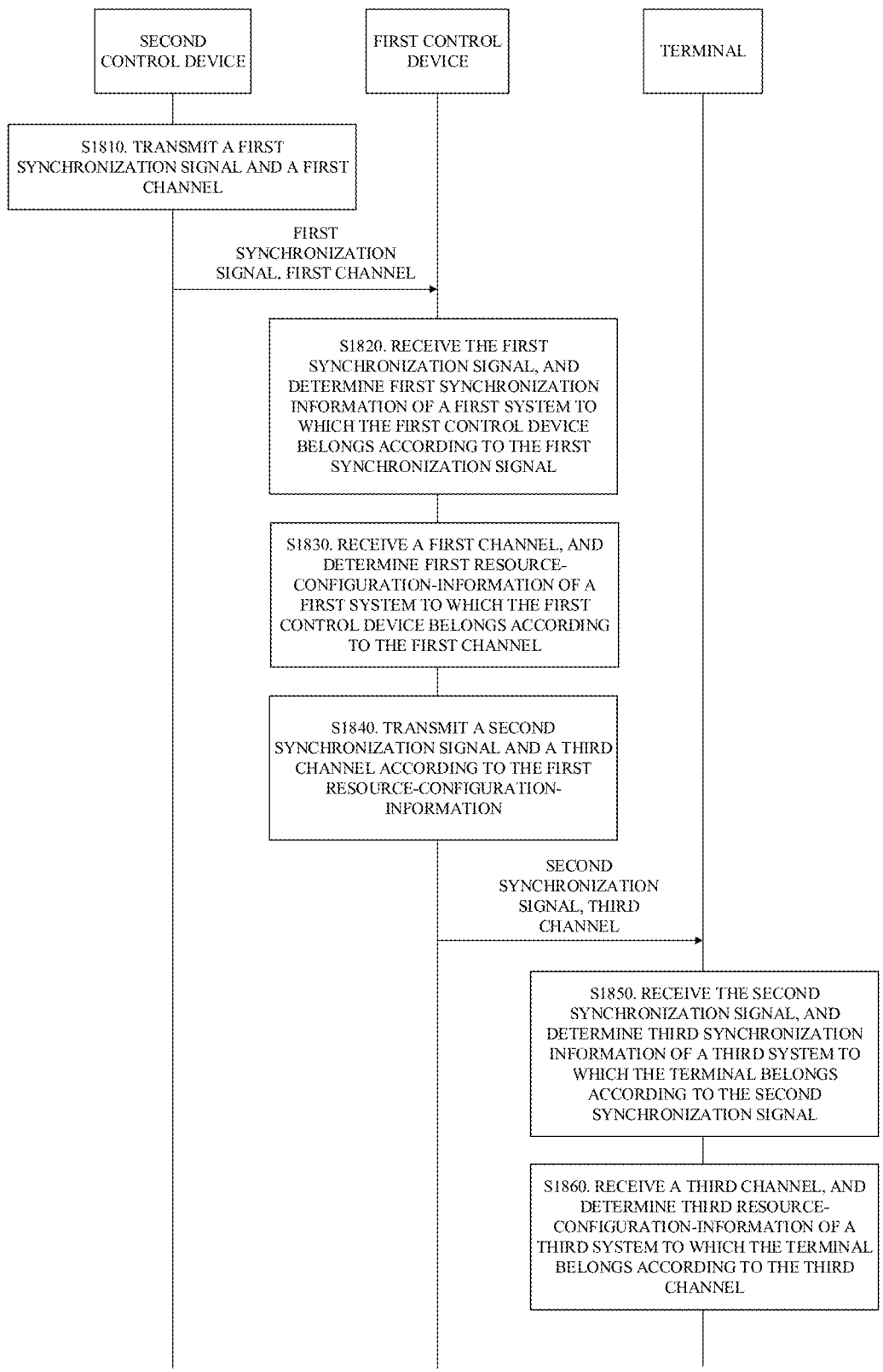
FIG. 18 is a schematic flowchart of another wireless communication method provided in implementations of the disclosure.

For the above "communication scenario 1", "communication scenario 2", "communication scenario 3", or "communication scenario 4", a wireless communication method is provided in implementations of the disclosure, FIG. 18 is a flowchart of the method. The wireless communication method is applicable to the wireless communication system according to implementations of the disclosure. The method includes the following.

S1810, a second control device transmits a first synchronization signal and a first channel.

Specifically, the second control device can transmit the first synchronization signal on a target carrier.

Specifically, the first synchronization signal can include a first primary-synchronization-signal and a first secondary-synchronization-signal.

Specifically, a time-frequency resource location of the first synchronization signal and a time-frequency resource location of the first channel are in a preset relationship.

Specifically, the first channel carries first information and at least one second information.

Furthermore, the first information includes indication information, the indication information indicates a time-frequency resource location for transmitting a PBCH by each of secondary control devices associated with the second control device. It should be note that, the indication information may indicate a time-frequency resource location for transmitting a third channel by a first control device.

Furthermore, the first information may further include indication information, the indication information indicates a time-frequency resource location for transmitting the synchronization signal by each of secondary control devices associated with the second control device. It should be noted that, the indication information may indicate a time-frequency resource location for transmitting a second synchronization signal by a first control device.

Specifically, the first channel includes a PBCH.

S1820, the first control device receives the first synchronization signal, and determines first synchronization information of a first system to which the first control device belongs according to the first synchronization signal.

The first control device is one of at least one secondary control device. A communication sub-system to which the first control device belongs is different from a communication sub-system wo which the second control device belongs.

S1830, the first control device receives a first channel, and determines first resource-configuration-information of a first system to which the first control device belongs according to the first channel.

It should be noted that, two manners for the first control device to determine the first resource-configuration-information is consistent to the implementation illustrated in FIG. 11, and will not be repeated herein.

Specifically, the first resource-configuration-information may include at least one of: a subcarrier spacing, a system frame number, indication information for indicating a time-frequency resource location of a third channel, indication information for indicating a time-frequency resource location of a second synchronization signal, a communication sub-system ID, and scheduling information for communication sub-system dedicated transmission information.

S1840, the first control device transmits a second synchronization signal and a third channel according to the first resource-configuration-information.

Specifically, a time-frequency resource location of the first synchronization signal and a time-frequency resource location of the second synchronization signal are in a preset relationship. It should be noted that, the preset relationship can be inferred from implementations of FIG. 10, FIG. 11, FIG. 14, FIG. 15, or FIG. 16, and will not be repeated herein.

Specifically, the time-frequency resource location of the first synchronization signal and a time-frequency resource location of the third channel are in a preset relationship. It should be noted that, the preset relationship can be inferred from implementations of FIG. 10, FIG. 11, FIG. 14, FIG. 15, or FIG. 16, and will not be repeated herein.

Specifically, a time-frequency resource location of the first channel and the time-frequency resource location of the second synchronization signal are in a preset relationship. It should be noted that, the preset relationship can be inferred from implementations of FIG. 10, FIG. 11, FIG. 14, FIG. 15, or FIG. 16, and will not be repeated herein.

Specifically, the time-frequency resource location of the first channel and the time-frequency resource location of the third channel are in a preset relationship. It should be noted that, the preset relationship can be inferred from implementations of FIG. 10, FIG. 11, FIG. 14, FIG. 15, or FIG. 16, and will not be repeated herein.

Specifically, the time-frequency resource location of the second synchronization signal and the time-frequency resource location of the third channel are in a preset relationship. It should be noted that, the preset relationship can be inferred from implementations of FIG. 10, FIG. 11, FIG. 14, FIG. 15, or FIG. 16, and will not be repeated herein.

Specifically, the time-frequency resource location of the third channel can be indicated by the first channel; or the time-frequency resource location of the third channel is determined as follows: the terminal obtains scheduling information for system broadcast information according to the third channel, and obtains the time-frequency resource location of the third channel by reading, according to the scheduling information, system broadcast information transmitted by the first control device.

Specifically, the number of bits occupied by the third channel is a fourth number of bits. The fourth number of bits is indicated by the first channel or pre-configured.

Specifically, the number of bits occupied by the third channel can be indicated by the second synchronization signal.

Specifically, the second synchronization signal can include a second primary-synchronization-signal and a second secondary-synchronization-signal. It can be understood that, the first control device transmits the second primary-synchronization-signal and the second secondary-synchronization-signal in a communication sub-system to which the first control device belongs.

Furthermore, the second primary-synchronization-signal can carry a third ID and the second secondary-synchronization-signal can carry a fourth ID. A synchronization ID in third synchronization information can be uniquely determined according to the third ID and the fourth ID. Similarly, the synchronization ID in the third synchronization information can be uniquely determined according to a synchronization ID. That is to say, when the third ID in the second primary-synchronization-signal and the fourth ID in the second secondary-synchronization-signal are received, the terminal can determine the synchronization ID according to the third ID and the fourth ID.

Furthermore, the third ID, the fourth ID, and the synchronization ID are unrelated to communication sub-systems in the wireless communication system. That is to say, the third ID and the fourth ID can be determined by the second control device, can be pre-configured, or determined by the primary control device according to a vehicle ID. Similarly, the synchronization ID can be determined by the second control device, can be pre-configured, or can be determined by the primary control device according to a vehicle ID.

Specifically, a synchronization ID corresponding to the second synchronization signal does not overlap with a synchronization ID corresponding to the first synchronization signal. For example, the synchronization ID corresponding to the first synchronization signal ranges in 0~511, the synchronization ID corresponding to the second synchronization signal ranges in 512~1023. As such, the terminal located in the communication sub-system to which the first control device belongs can be prevented from synchronizing to the communication sub-system of the second control device belongs.

Furthermore, in ranges of synchronization ID available for different second control devices, it is possible that a range of synchronization ID available for one second control device does not overlap with a range of synchronization ID available for another second control device. Ranges of synchronization ID available for different second control devices are specified in protocol or pre-configured. For example, a control device supporting a first type of service is the second control device, and a synchronization ID is available in range 0~511; for a control device supporting a second type of service, a synchronization ID is available in range 512~611; for a control device supporting a third type of service, a synchronization ID is available in range 612~712, and so on. As such, a terminal in a communication sub-system to which a second control device belongs can be synchronized to the corresponding second control devices correctly.

Furthermore, the synchronization ID corresponding to the second synchronization signal is allocated within a corresponding value range by the second control device.

S1850, the terminal receives the second synchronization signal, and determines third synchronization information of a third system to which the terminal belongs according to the second synchronization signal.

It should be noted that, the communication sub-system to which the terminal belongs is the same as a communication sub-system to which the first control device belongs.

Specifically, the third synchronization information includes a synchronization ID. It can be understood that, the terminal can determine the synchronization ID according to a third ID in a second primary-synchronization-signal and a fourth ID in a second secondary-synchronization-signal.

Specifically, the third synchronization information can include at least one of: a synchronization ID, a start of a superframe, an index of a superframe, a start of a frame, or an index of a frame.

Specifically, after S1850, the terminal can receive the second synchronization signal according to a pre-configured synchronization ID.

S1860, the terminal receives a third channel, and determines third resource-configuration-information of a third system to which the terminal belongs according to the third channel.

Specifically, before S1860, the terminal can determine a time-frequency resource location of the third channel according to a time-frequency resource location of the second synchronization signal.

The following describes two manners for the terminal to determine the third resource-configuration-information.

Manner 1:

The terminal obtains the third resource-configuration-information directly according to information carried by the third channel. The information carried by the third channel may include at least one of: a subcarrier spacing, a system frame number, a communication sub-system ID, and scheduling information for communication sub-system ID dedicated broadcast message.

Specifically, the third resource-configuration-information may include at least one of: a subcarrier spacing, a system frame number, a communication sub-system ID, and scheduling information for communication sub-system ID dedicated broadcast message.

Manner 2:

The terminal obtains scheduling information for system broadcast information through the third channel, and obtains related resource configuration information by reading the system broadcast information.

Specifically, the terminal determines the third resource-configuration-information of the communication sub-system to which the terminal belongs according to the third channel received as follows: the terminal receives scheduling information for SIB system broadcast information, where the scheduling information is obtained by the terminal according to the third channel; the terminal obtains the third resource-configuration-information by reading, according to the scheduling information, the system broadcast information transmitted by the first control device.

Furthermore, the system broadcast information includes a SIB.

It should be noted that, the technical scheme of the implementation illustrated in FIG. 18 is consistent with part of the technical schemes of the implementations illustrated in FIG. 10, FIG. 11, FIG. 14, FIG. 15, or FIG. 16, and for those skilled in the art, for details of the technical scheme of the implementation illustrated in FIG. 18, reference can be made to the technical scheme of the implementation illustrated in FIG. 10, FIG. 11, FIG. 14, FIG. 15, or FIG. 16, which will not be repeated herein again.

As can be seen, in implementations of the disclosure, the second control device in the wireless communication system transmits the first synchronization signal and the first channel to at least one secondary control device in the wireless communication system. The first synchronization signal provides synchronization information of at least one communication sub-system in the wireless communication system, and the first channel indicates resource configuration information of at least one communication sub-system in the wireless communication system. Since the at least one secondary control device is located in the at least one communication sub-system, one of the at least one secondary control device can obtain the synchronization information and the related resource configuration information of the communication sub-system to which the secondary control device belongs by receiving the first synchronization signal and the first channel, to establish an initial connection between the second control device and the secondary control device. Furthermore, the at least one secondary control device transmits the second synchronization signal and the third channel to at least one terminal according to related resource configuration information, and one of the at least one terminal can obtain synchronization information and related resource configuration information of a communication sub-system to which the terminal belongs by receiving the second synchronization signal and the third channel, to establish an initial connection between the secondary control device and the terminal, and establish an initial connection between the second control device and the terminal. Furthermore, instead of transmitting the synchronization signal and the first channel to one or more communication systems separately, the second control device transmits the synchronization signal and the first channel to all secondary control devices in the at least one communication sub-system in the wireless communication system and therefore, the at least one communication sub-system receives the synchronization signal and the first channel in a common frequency-band range to achieve synchronization and related resource configuration thereof, which is conductive to reducing the frequency-band resource occupied by the second control device or the secondary control device for transmitting the synchronization signal and/or the first channel and conductive to simplifying the deployment complexity of the entire wireless communication system.

Figure 19:
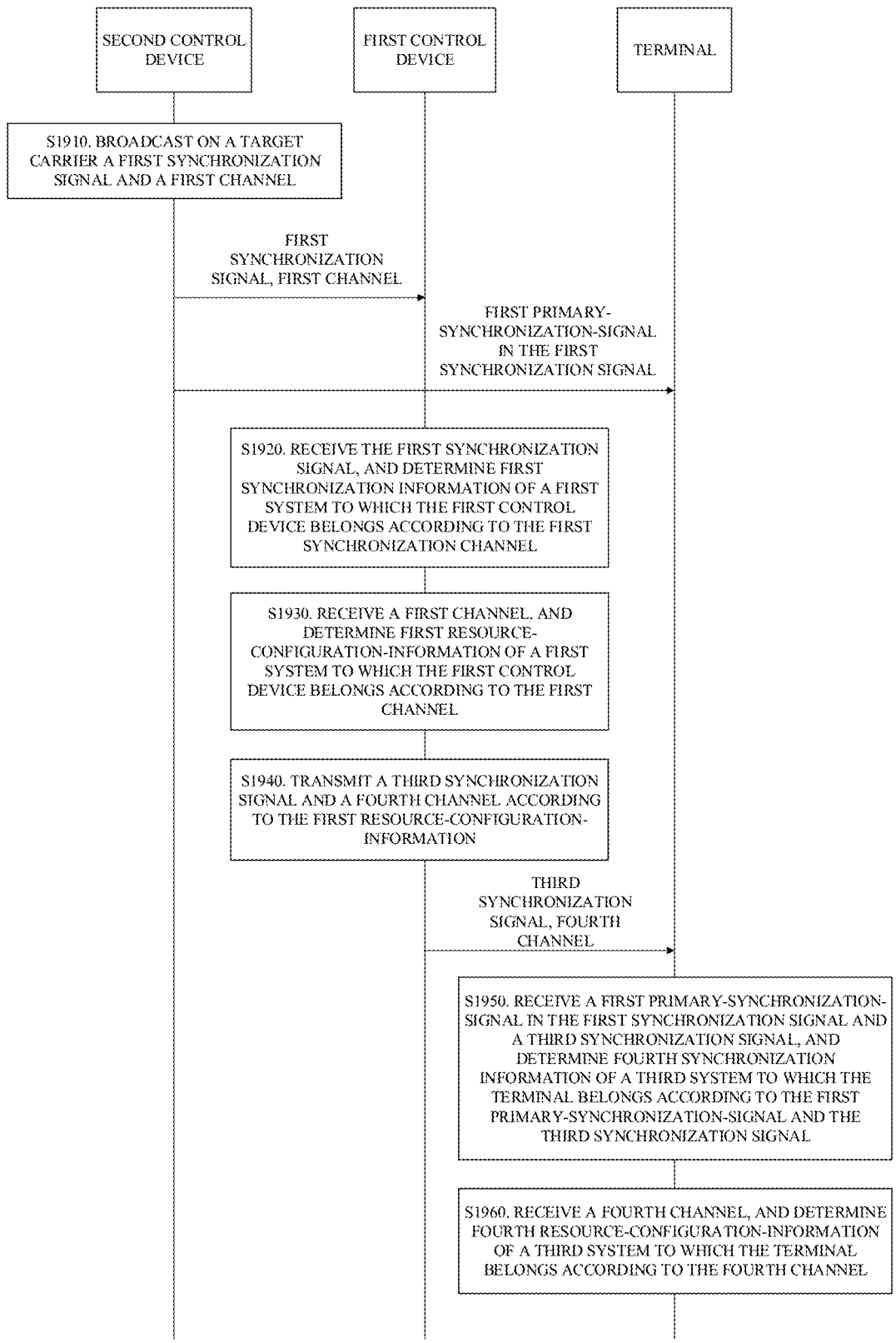
FIG. 19 is a schematic flowchart of another wireless communication method provided in implementations of the disclosure.

For the above "communication scenario 1", "communication scenario 2", "communication scenario 3", or "communication scenario 4", a wireless communication method is provided in implementations of the disclosure, FIG. 19 is a flowchart of the method. The wireless communication method is applicable to the wireless communication system according to implementations of the disclosure. The method includes the following.

S1910, a second control device transmits a first synchronization signal and a first channel.

The first synchronization signal can provide synchronization information of all communication sub-systems in a wireless communication system, the first channel can indicate resource configuration information of all communication sub-systems in the wireless communication system directly or indirectly.

Specifically, the first synchronization signal can include a first primary-synchronization-signal and a first secondary-synchronization-signal.

S1920, a first control device receives the first synchronization signal, and determines first synchronization information of a communication sub-system to which the first control device belongs according to the first synchronization channel.

The first control device is one of at least one secondary control device. A communication sub-system to which the first control device belongs is different from a communication sub-system to which the second control device belongs.

S1930, the first control device receives a first channel, and determines first resource-configuration-information of a first system to which the first control device belongs according to the first channel.

It should be noted that, two manners for the first control device to determine the first resource-configuration-information is consistent to the implementation illustrated in FIG. 11, and will not be repeated herein.

S1940, the first control device transmits a third synchronization signal and a fourth channel according to the first resource-configuration-information.

The third synchronization signal can provide synchronization information of a communication sub-system to which the first control device belongs, and the fourth channel can indicate resource configuration information of the communication sub-system to which the fourth channel belongs directly or indirectly.

Specifically, the third synchronization signal may include a third secondary-synchronization-signal only, and the third secondary-synchronization-signal carries a sixth ID. Or, the third synchronization signal may include a third primary-synchronization-signal and a third secondary-synchronization-signal, the third primary-synchronization-signal may be the same as or different from the first primary-synchronization-signal, and the third secondary-synchronization-signal may be the same as or different from the first secondary-synchronization-signal. The third primary-synchronization-signal carries a fifth ID and the third secondary-synchronization-signal carries a sixth ID. It can be understood that, the first control device transmits the third synchronization signal in a communication sub-system to which the first control device belongs.

Specifically, a time-frequency resource location of the first synchronization signal and a time-frequency resource location of the third synchronization signal are in a preset relationship. It should be noted that, the preset relationship can be inferred from implementations of FIG. 10, FIG. 11, FIG. 14, or FIG. 15, which will not be repeated herein.

Specifically, the time-frequency resource location of the first synchronization signal and a time-frequency resource location of the fourth channel are in a preset relationship. It should be noted that, the preset relationship can be inferred from implementations of FIG. 10, FIG. 11, FIG. 14, or FIG. 15, which will not be repeated herein.

Specifically, the time-frequency resource location of the third synchronization signal and the time-frequency resource location of the fourth channel are in a preset relationship. It should be noted that, the preset relationship can be inferred from implementations of FIG. 10, FIG. 11, FIG. 14, or FIG. 15, which will not be repeated herein.

Specifically, the time-frequency resource location of the fourth channel can be indicated by the first channel, or the time-frequency resource location of the fourth channel is determined as follows: the terminal obtains scheduling information for system broadcast information according to the fourth channel, and obtains the time-frequency resource location of the fourth channel by reading, according to the scheduling information, the system broadcast information transmitted by the first control device.

Specifically, the number of bits occupied by the fourth channel is a fifth number of bits. The fifth number of bits is indicated by the first channel or pre-configured.

Specifically, the number of bits occupied by the fourth channel can be indicated by the third synchronization signal.

S1950, the terminal receives a first primary-synchronization-signal in the first synchronization signal and a third synchronization signal, and determines fourth synchronization information of a third system to which the terminal belongs according to the first primary-synchronization-signal and the third synchronization signal.

It should be noted that, the terminal can receive the first primary-synchronization-signal in the first synchronization signal and a third secondary-synchronization-signal in the third synchronization signal, to obtain fourth synchronization information of a communication sub-system to which the terminal belongs.

It should be noted that, a communication sub-system to which the terminal belongs is the same as a communication sub-system to which the first control device belongs.

Specifically, the terminal can determine a synchronization ID in fourth synchronization information uniquely according to the first ID carried in the first primary-synchronization-signal of the first synchronization signal and the sixth ID carried in the third secondary-synchronization-signal of the third synchronization signal.

Furthermore, the first ID, the sixth ID, and the synchronization ID are unrelated to communication sub-systems in a wireless communication system.

Specifically, the synchronization ID in the fourth synchronization information does not overlap with the synchronization ID in the first synchronization information.

Furthermore, the synchronization ID in the first synchronization information is allocated within a corresponding value range by the second control device, the synchronization ID in the fourth synchronization information is allocated within a corresponding value range by the second control device.

Specifically, the fourth synchronization information can include at least one of: a synchronization ID, a start of a superframe, an index of a superframe, a start of a frame, or an index of a frame.

S1960, the terminal receives a fourth channel, and determines fourth resource-configuration-information of a third system to which the terminal belongs according to the fourth channel.

Specifically, before S1960, the terminal can determine a time-frequency resource location of the fourth channel according to at least one of a time-frequency resource location of the first primary-synchronization-signal and a time-frequency resource location of the third synchronization signal.

The following describes two manners for the terminal to determine the fourth resource-configuration-information.

Manner 1:

The terminal obtains the fourth resource-configuration-information directly according to information carried by the fourth channel. The information carried by the fourth channel may include at least one of: a subcarrier spacing, a system frame number, a communication sub-system ID, and scheduling information for communication sub-system ID dedicated broadcast message.

Specifically, the fourth resource-configuration-information may include at least one of: a subcarrier spacing, a system frame number, a communication sub-system ID, and scheduling information for communication sub-system ID dedicated broadcast message.

Manner 2:

The terminal obtains scheduling information for system broadcast information through according to the fourth channel, and obtains related resource configuration information by reading the system broadcast information.

Specifically, the terminal determines the fourth resource-configuration-information of the communication sub-system to which the terminal belongs according to the fourth channel as follows: the terminal receives scheduling information for SIB system broadcast information, where the scheduling information is obtained by the terminal according to the fourth channel; the terminal obtains the fourth resource-configuration-information by reading, according to the scheduling information, the system broadcast information transmitted by the first control device.

Specifically, the system broadcast information may include a SIB.

It should be noted that, the technical scheme of the implementation illustrated in FIG. 19 is consistent with part of the technical schemes of the implementations illustrated in FIG. 10, FIG. 11, FIG. 14, FIG. 15, FIG. 16, or FIG. 18, and for those skilled in the art, for details of the technical scheme of the implementation illustrated in FIG. 16, reference can be made to the technical scheme of the implementation illustrated in FIG. 10, FIG. 11, FIG. 14, FIG. 15, FIG. 16, or FIG. 18, which will not be repeated herein again.

As can be seen, in implementations of the disclosure, the second control device in the wireless communication system transmits on a target carrier the first synchronization signal and the first channel to at least one secondary control device in the wireless communication system, and transmits the first synchronization signal to at least one terminal. The first synchronization signal provides synchronization information of at least one communication sub-system in the wireless communication system, and the first channel indicates resource configuration information of at least one communication sub-system in the wireless communication system. Since the at least one secondary control device is located in the at least one communication sub-system, one of the at least one secondary control device can obtain the synchronization information and the related resource configuration information of the communication sub-system to which the secondary control device belongs by receiving the first synchronization signal and the first channel, to establish an initial connection between the second control device and the secondary control device. Furthermore, the at least one secondary control device transmits the fourth channel to at least one terminal according to related resource configuration information, and one of the at least one terminal can obtain synchronization information and related resource configuration information of a communication sub-system to which the terminal belongs by receiving the first primary-synchronization-signal in the first synchronization signal, the third synchronization signal, and the fourth channel, to establish an initial connection between the secondary control device and the terminal, and establish an initial connection between the second control device and the terminal. Furthermore, instead of transmitting the synchronization signal and the first channel to one or more communication systems separately, the second control device transmits the synchronization signal and the first channel to all secondary control devices in the at least one communication sub-system in the wireless communication system and therefore, the at least one communication sub-system receives the synchronization signal and the first channel in a common frequency-band range to achieve synchronization and related resource configuration thereof, which is conductive to reducing the frequency-band resource occupied by the second control device or the secondary control device for transmitting the synchronization signal and/or the first channel and conductive to simplifying the deployment complexity of the entire wireless communication system.

Technical solutions of implementations of the disclosure are described from the aspect of method. It is understandable that, in order to implement the above functions, the second control device, the first control device, and the terminal include hardware structures and/or software modules for performing the respective functions. Those skilled in the art should readily recognize that, in combination with the units and algorithmic operations of various examples described in the implementations disclosed herein, the present disclosure can be implemented in hardware or a combination of hardware and computer software. Whether a function is implemented by way of hardware or hardware driven by computer software depends on the particular application and design constraints of the technical solution. Those skilled in the art may use different methods to implement the described functions for each particular application, and such implementation should not be considered as beyond the scope of the present disclosure.

According to the implementations of the disclosure, functional units may be divided for the second control device, the first control device, and the terminal in accordance with the foregoing method examples. For example, each functional unit may be divided according to each function, and two or more functions may be integrated in one processing unit.

The above-mentioned integrated unit can be implemented in the form of hardware or software program modules. It should be noted that the division of units in implementations of the present disclosure is schematic and is merely a logical function division, and there may be other division manners in actual implementation.

Figure 20:
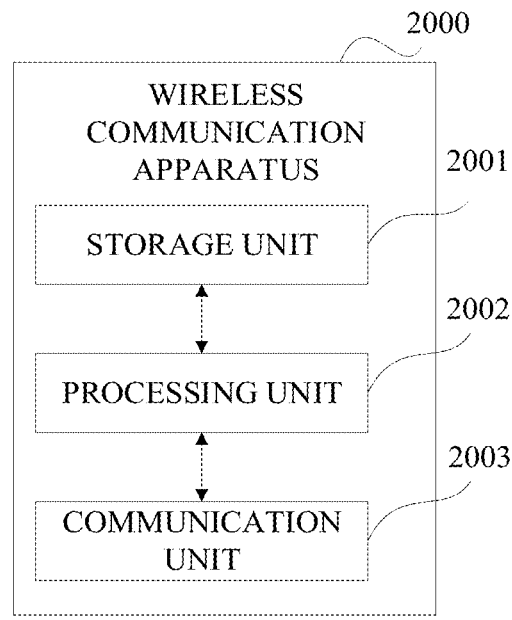
FIG. 20 is a block diagram of functional units of a wireless communication apparatus provided in implementations of the disclosure.

In the case of an integrated unit, FIG. 20 is a block diagram of functional units of a wireless communication apparatus. A wireless communication resource configuration device 2000 is applied to the first control device and includes a processing unit 2002 and a communication unit 2003. The processing unit 2002 is configured to control and manage actions of the first control device, for example, the processing unit 2002 is configured to support the first control device to perform the operations in FIG. 10, FIG. 11, FIG. 14, FIG. 15, FIG. 16, FIG. 18, or FIG. 19 and other processes of the technical schemes described herein. The communication unit 2003 is configured to support communication between the first control device and the terminal or between the first control device and the second control device. The wireless communication resource configuration device 2000 further includes a storage unit 2001 configured to store program codes and data of the first control device.

The processing unit 2002 can be a processor or a controller, for example, a central processing unit (CPU), a general-purpose processor, a digital signal processor (DSP), an application-specific integrated circuit (ASIC), a field programmable gate array (FPGA), other programmable logic devices, transistor logic devices, hardware components, or any combination thereof. Various exemplary logical blocks, modules, and circuits described in conjunction with the disclosure may be achieved or implemented. The processing unit 2002 also may be a combination realizing computing functions, for example, a combination of one or more microprocessors, a combination of the DSP and the microprocessor, or the like. The communication unit 2003 may be a communication interface, a transceiver, a transceiver circuit, or the like. The storage unit 2001 may be a memory. When the processing unit 2002 is the processor, the communication unit 1803 is the communication interface, and the storage unit 2001 is the memory, the wireless communication apparatus 2000 in implementations of the disclosure may be the first control device illustrated in FIG. 23.

In a specific implementation, the processing unit 2002 is configured to perform any of operations performed by the first control device in the foregoing method implementations, and when performing data transmission such as transmitting, it is possible to invoke the communication unit 2003 to complete corresponding operations, which will be described below in detail.

The processing unit 2002 is configured to receive a first synchronization signal from a second control device, and determine synchronization information of a first system to which the first control device belongs according to the first synchronization signal.

As can be seen, in implementations of the disclosure, since the at least one first device is located in the at least one communication sub-system in a wireless communication system, the wireless communication resource configuration device can obtain the synchronization information of the communication sub-system to which the wireless communication resource configuration device belongs by receiving the first synchronization signal, to achieve synchronization between the second control device and the first control device.

In a possible implementation, the first synchronization signal includes a first primary-synchronization signal and a first secondary-synchronization signal. The synchronization information includes a first synchronization identifier (ID), the first primary-synchronization signal carries a first ID, and the second secondary-synchronization signal carries a second ID. The first synchronization ID is determined according to the first ID and the second ID.

In a possible implementation, the synchronization information includes at least one of: the first synchronization ID, a start of a superframe, an index of a superframe, a start of a frame, or an index of a frame.

In a possible implementation, the processing unit is further configured to receive a first channel transmitted by the second control device, and determine first resource-configuration-information of the first system to which the first control device belongs according to the first channel.

In a possible implementation, a number of bits occupied by the first channel is related to a number of secondary control devices associated with the second control device.

In a possible implementation, the number of bits occupied by the first channel is indicated by the first synchronization signal, or, the number of bits occupied by the first channel is determined according to a number of communication sub-systems in a wireless communication system indicated by the first synchronization signal.

In a possible implementation, the processing unit is further configured to determine a time-frequency resource location of the first channel according to a time-frequency resource location of the first synchronization signal.

In a possible implementation, the first channel carries first information and at least one second information. The first information is applicable to a second system to which the second control device belongs and a system to which at least one first control device belongs. The second information is applicable to the second system to which the second control device belongs or a system to which one of at least one first control device belongs. The processing unit configured to determine the first resource-configuration-information of the first system to which the first control device belongs according to the first channel is configured to: determine the first resource-configuration-information according to the first information and the second information.

In a possible implementation, the first information includes at least one of: subcarrier spacing, system frame number; the second information includes at least one of: a communication sub-system ID, scheduling information for communication sub-system dedicated broadcast information.

In a possible implementation, a number of bits occupied by the first information is a first number of bits, a number of bits occupied by the second information is a second number of bits, and the first number of bits and the second number of bits are pre-configured.

In a possible implementation, in terms of determining the first resource-configuration-information of the first system to which the first control device belongs according to the first channel by the first control device, the processing unit is configured to: obtain, by the first control device, scheduling information for first system-broadcast-information according to the first channel; and obtain, by the first control device, the first resource-configuration-information by reading, according to the scheduling information, the first system-broadcast-information transmitted by the second control device.

In a possible implementation, the first system-broadcast-information includes a first system information block (SIB).

In a possible implementation, the first channel includes a first physical broadcast channel (PBCH).

In a possible implementation, the processing unit is further configured to: transmit, by the first control device, a second channel according to the first resource-configuration-information.

In a possible implementation, the first resource-configuration-information contains a time-frequency resource location of the second channel.

In a possible implementation, the time-frequency resource location of the second channel is indicated by the first channel, or the time-frequency resource location of the second channel is determined by: obtaining scheduling information for second system broadcast information according to the first channel, and obtaining the time-frequency resource location of the second channel by reading, according to the scheduling information, the second system broadcast information transmitted by the second control device.

In a possible implementation, the second system broadcast information includes a second SIB.

In a possible implementation, the second channel includes a second PBCH.

In a possible implementation, the processing unit is further configured to: transmit, by the first control device, a second synchronization signal and a third channel according to the first resource-configuration-information.

In a possible implementation, the second synchronization signal includes a second primary-synchronization signal and a second secondary-synchronization signal. The second primary-synchronization signal can carry a third ID and the second secondary-synchronization signal can carry a fourth ID.

In a possible implementation, the first resource-configuration-information contains a time-frequency resource location of the second synchronization signal and a time-frequency resource location of the third channel.

In a possible implementation, the time-frequency resource location of the second synchronization signal and the time-frequency resource location of the third channel are indicated by the first channel, or the time-frequency resource location of the second synchronization signal and the time-frequency resource location of the third channel are determined by: obtaining scheduling information for third system broadcast information according to the first channel, and obtaining the time-frequency resource location of the second synchronization signal and the time-frequency resource location of the third channel by reading, according to the scheduling information, the third system broadcast information transmitted by the second control device.

In a possible implementation, the third system broadcast information includes a third SIB.

In a possible implementation, a synchronization ID corresponding to the second synchronization signal transmitted by the first control device does not overlap with a synchronization ID corresponding to the first synchronization signal transmitted by the second control device.

In a possible implementation, the synchronization ID corresponding to the second synchronization signal transmitted by the first control device is allocated by the second control device within a corresponding value range.

In a possible implementation, the third channel includes a third PBCH.

In a possible implementation, the processing unit is further configured to: transmit, by the first control device, a third synchronization signal and a fourth channel according to the first resource-configuration-information.

In a possible implementation, the third synchronization signal includes a third secondary-synchronization signal only, or the third synchronization signal includes the third secondary-synchronization signal and a third secondary-synchronization signal. The third primary-synchronization signal is the same as or different from the first primary-synchronization signal, the third secondary-synchronization signal is the same as or different from the first secondary-synchronization signal.

In a possible implementation, the first resource-configuration-information contains a time-frequency resource location of the third synchronization signal and a time-frequency resource location of the fourth channel.

In a possible implementation, the time-frequency resource location of the third synchronization signal and the time-frequency resource location of the fourth channel are indicated by the first channel, or the time-frequency resource location of the third synchronization signal and the time-frequency resource location of the fourth channel are determined by: obtaining scheduling information for fourth system broadcast information according to the first channel, and obtaining the time-frequency resource location of the third synchronization signal and the time-frequency resource location of the fourth channel by reading, according to the scheduling information, the fourth system broadcast information transmitted by the second control device.

In a possible implementation, the fourth system broadcast information includes a fourth SIB.

In a possible implementation, the fourth channel includes a fourth PBCH.

In a possible implementation, the first control device is a secondary control device, the second control device is a primary control device.

Figure 21:
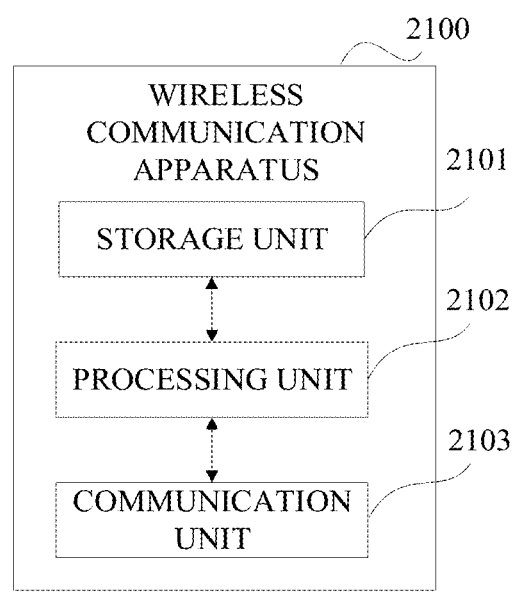
FIG. 21 is a block diagram of functional units of another wireless communication apparatus provided in implementations of the disclosure.

In the case of an integrated unit, FIG. 21 is a block diagram of functional units of another wireless communication apparatus. A wireless communication apparatus 2100 is applied to the terminal and includes a processing unit 2102 and a communication unit 2103. The processing unit 2102 is configured to control and manage actions of the terminal, for example, the processing unit 2102 is configured to support the terminal to perform the operations mentioned above and/or other processes of the technical schemes described herein. The communication unit 2103 is configured to support communication between the terminal and the first control device or between the terminal and the second control device. The wireless communication resource configuration device 2100 further includes a storage unit 2101 configured to store program codes and data of the terminal.

The processing unit 2102 can be a processor or a controller, for example, a CPU, a general-purpose processor, a DSP, an ASIC, a FPGA, other programmable logic devices, transistor logic devices, hardware components, or any combination thereof. Various exemplary logical blocks, modules, and circuits described in conjunction with the disclosure may be achieved or implemented. The processing unit 2102 also may be a combination realizing computing functions, for example, a combination of one or more microprocessors, a combination of the DSP and the microprocessor, or the like. The communication unit 2103 may be a communication interface, a transceiver, a transceiver circuit, or the like. The storage unit 2101 may be a memory. When the processing unit 2102 is the processor, the communication unit 2103 is the communication interface, and the storage unit 2101 is the memory, the wireless communication apparatus 2100 in implementations of the disclosure may be the terminal illustrated in FIG. 24.

In a specific implementation, the processing unit 2102 is configured to perform any of operations performed by the terminal in the foregoing method implementations, and when performing data transmission such as transmitting, it is possible to invoke the communication unit 2103 to complete corresponding operations, which will be described below in detail.

The processing unit 2102 is configured to receive a synchronization signal, and determine synchronization information of a third system to which the terminal belongs according to the synchronization signal.

As can be seen, in implementations of the disclosure, since the at least one terminal is located in the at least one communication sub-system, the wireless communication resource configuration device can obtain the synchronization information of the communication sub-system to which the wireless communication resource configuration device belongs by receiving the synchronization signal, to achieve synchronization.

In a possible implementation, the synchronization signal is a first synchronization signal transmitted by a second control device. In terms of determining, by the terminal, the synchronization information of the third system to which the terminal belongs according to the synchronization signal, the processing unit is configured to determine the synchronization information according to the first synchronization signal.

In a possible implementation, the synchronization information includes a synchronization identifier (ID), the first synchronization signal includes a first primary-synchronization signal and a first secondary-synchronization signal. The first primary-synchronization signal carries a first ID, the second secondary-synchronization signal carries a second ID, the synchronization ID is determined according to the first ID and the second ID.

In a possible implementation, the synchronization information includes at least one of: the synchronization ID, a start of a superframe, an index of a superframe, a start of a frame, or an index of a frame.

In a possible implementation, the processing unit is further configured to receive, through the communication unit, a first channel transmitted by the second control device, and determine first resource-configuration-information of the third system to which the terminal belongs according to the first channel.

In a possible implementation, a number of bits occupied by the first channel is indicated by the first synchronization signal, or, the number of bits occupied by the first channel is determined according to a number of communication sub-systems in a wireless communication system indicated by the first synchronization signal.

In a possible implementation, the processing unit is further configured to determine a time-frequency resource location of the first channel according to a time-frequency resource location of the first synchronization signal.

In a possible implementation, the first channel carries first information and at least one second information. The first information is applicable to a second system to which the second control device belongs and a system to which at least one first control device belongs. The second information is applicable to the system to which the second control device belongs or a system to which one of the at least one first control device belongs. The processing unit configured to determine the first resource-configuration-information of the third system to which the terminal belongs according to the first channel is configured to: obtain, by the terminal, the first resource-configuration-information according to the first information and the second information.

In a possible implementation, the first information includes at least one of: subcarrier spacing, system frame number; the second information includes at least one of: a communication sub-system ID, scheduling information for communication sub-system dedicated broadcast information.

In a possible implementation, a number of bits occupied by the first information is a first number of bits, a number of bits occupied by the second information is a second number of bits, and the first number of bits and the second number of bits are pre-configured.

In a possible implementation, the processing unit configured to determine the first resource-configuration-information of the third system to which the terminal belongs according to the first channel is configured to: obtain scheduling information for system broadcast information according to the first channel; and obtain the first resource-configuration-information by reading, according to the scheduling information, the system broadcast information transmitted by the second control device.

In a possible implementation, the first channel includes a first physical broadcast channel (PBCH).

In a possible implementation, the processing unit is further configured to: receive, through the communication unit, a second channel transmitted by a first control device; and determine second resource configuration information of the third system to which the terminal belongs, according to the second channel.

In a possible implementation, the second resource configuration information is determined according to information carried by the second channel. The second resource configuration information includes at least one of: subcarrier spacing, system frame number, a communication sub-system ID, scheduling information for communication sub-system dedicated broadcast information.

In a possible implementation, the processing unit configured to determine the second resource configuration information of the system to which the terminal belongs according to the second channel is configured to obtain scheduling information for system broadcast information according to the second channel; and obtain the second resource configuration information by reading, according to the scheduling information, the system broadcast information transmitted by the first control device.

In a possible implementation, a time-frequency resource location of the second channel is indicated by the first channel, or the time-frequency resource location of the second channel is determined by: obtaining scheduling information for the system broadcast information according to the second channel, and obtaining the time-frequency resource location of the second channel by reading, according to the scheduling information, the system broadcast information transmitted by the first control device.

In a possible implementation, the processing unit is further configured to determine the time-frequency resource location of the second channel according to a time-frequency resource location of the first synchronization signal.

In a possible implementation, a number of bits occupied by the second channel is a third number of bits, and the third number of bits is preconfigured or indicated by the first channel.

In a possible implementation, the second channel includes a second PBCH.

In a possible implementation, the synchronization signal is a second synchronization signal transmitted by the first control device, and the processing unit configured to determine the synchronization information of the system to which the terminal belongs according to the synchronization signal is configured to determine the synchronization information according to the second synchronization signal.

In a possible implementation, the second synchronization signal includes a second primary-synchronization signal and a second secondary-synchronization signal, the second primary-synchronization signal can carry a third ID and the second secondary-synchronization signal can carry a fourth ID.

In a possible implementation, the processing unit is further configured to receive, through the communication unit, a third channel transmitted by the first control device; and determine third resource configuration information of the system to which the terminal belongs according to the third channel.

In a possible implementation, the third resource configuration information is determined according to information carried by the third channel. The third resource configuration information includes at least one of: subcarrier spacing, system frame number, a communication sub-system ID, scheduling information for communication sub-system ID dedicated broadcast information.

In a possible implementation, the processing unit configured to determine the third resource configuration information of the system to which the terminal belongs according to the third channel is configured to obtain scheduling information for SIB system broadcast information according to the third channel; and obtain the third resource configuration information by reading, according to the scheduling information, system broadcast information transmitted by the first control device.

In a possible implementation, a time-frequency resource location of the third channel is determined by: obtaining scheduling information for system broadcast information according to the third channel, and obtaining the time-frequency resource location of the third channel by reading, according to the scheduling information, system broadcast information transmitted by the first control device.

In a possible implementation, the processing unit is further configured to determine the time-frequency resource location of the third channel according to a time-frequency resource location of the second synchronization signal.

In a possible implementation, a number of bits occupied by the third channel is a fourth number of bits, and the fourth number of bits is preconfigured.

In a possible implementation, the third channel includes a third PBCH.

In a possible implementation, the synchronization signal includes a first primary-synchronization signal in the first synchronization signal transmitted by the second control device and a third synchronization signal transmitted by the first control device. The processing unit configured to determine the synchronization information according to the synchronization signal is configured to determine the synchronization information according to the first primary-synchronization signal and the third synchronization signal.

In a possible implementation, the third synchronization signal includes a third primary-synchronization signal and a third secondary-synchronization signal, or, the third synchronization signal includes the third secondary-synchronization signal. The third primary-synchronization signal carries a fifth ID, and the third secondary-synchronization signal carries a sixth ID.

In a possible implementation, the processing unit is further configured to receive, through the communication unit, a fourth channel transmitted by a first control device; and determine fourth resource configuration information of the system to which the terminal belongs according to the fourth channel.

In a possible implementation, the fourth resource configuration information is determined according to information carried by the fourth channel. The fourth resource configuration information includes at least one of: subcarrier spacing, system frame number, a communication sub-system ID, scheduling information for communication sub-system ID dedicated broadcast information.

In a possible implementation, the processing unit configured to determine the fourth resource configuration information of the system to which the terminal belongs according to the fourth channel is configured to obtain scheduling information for SIB system broadcast information according to the fourth channel; and obtain the fourth resource configuration information by reading, according to the scheduling information, system broadcast information transmitted by the first control device.

In a possible implementation, a time-frequency resource location of the fourth channel is determined by: obtaining scheduling information for the system broadcast information according to the fourth channel, and obtaining the time-frequency resource location of the fourth channel by reading, according to the scheduling information, the system broadcast information transmitted by the first control device.

In a possible implementation, the processing unit is further configured to determine the time-frequency resource location of the fourth channel according to at least one of: a time-frequency resource location of the first primary-synchronization signal and a time-frequency resource location of the third synchronization signal.

In a possible implementation, the fourth channel includes a fourth PBCH.

Figure 22:
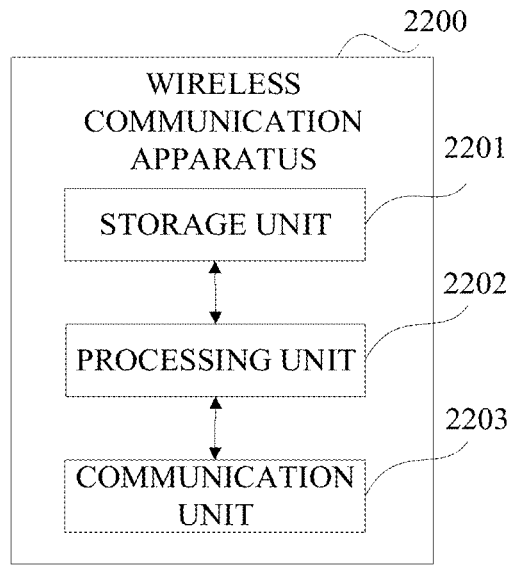
FIG. 22 is a block diagram of functional units of another wireless communication apparatus provided in implementations of the disclosure.

In the case of an integrated unit, FIG. 22 is a block diagram of functional units of another wireless communication apparatus provided in implementations of the disclosure. A wireless communication apparatus 2200 is applied to the second control device and includes a processing unit 2202 and a communication unit 2203. The processing unit 2202 is configured to control and manage the second control device, for example, the processing unit 2202 is configured to support the second control device to perform the operations mentioned above and/or other processes of the technical schemes described herein. The communication unit 2203 is configured to support communication between the second control device and the first control device or between the second control device and the terminal. The wireless communication apparatus 2200 further includes a storage unit 2201 configured to store program codes and data of the terminal.

The processing unit 2202 can be a processor or a controller, for example, a CPU, a general-purpose processor, a DSP, an ASIC, a FPGA, other programmable logic devices, transistor logic devices, hardware components, or any combination thereof. Various exemplary logical blocks, modules, and circuits described in conjunction with the disclosure may be achieved or implemented. The processing unit 2202 also may be a combination realizing computing functions, for example, a combination of one or more microprocessors, a combination of the DSP and the microprocessor, or the like. The communication unit 2203 may be a communication interface, a transceiver, a transceiver circuit, or the like. The storage unit 2201 may be a memory. When the processing unit 2202 is the processor, the communication unit 2203 is the communication interface, and the storage unit 2201 is the memory, the wireless communication apparatus 2200 in implementations of the disclosure may be the second control device illustrated in FIG. 25.

In a specific implementation, the processing unit 2202 is configured to perform any of operations performed by the second control device in the foregoing method implementations, and when performing data transmission such as transmitting, it is possible to invoke the communication unit 2203 to complete corresponding operations, which will be described below in detail.

The processing unit 2202 is configured to transmit a first synchronization signal. The first synchronization signal provides synchronization information of at least one communication sub-system in a wireless communication system.

As can be seen, the second control device in the wireless communication system transmit the first synchronization signal. The first synchronization signal provides the synchronization information of the at least one communication sub-system in the wireless communication system. Since the at least one first control device and at least one terminal are located in the at least one communication sub-system, one of the at least one first control device or one of the at least one terminal can obtain synchronization information of their own communication sub-system by receiving the first synchronization signal and a first channel, to achieve synchronization between the second control device and the first control device or synchronization between the second control device and the terminal.

In a possible implementation, the synchronization information includes a synchronization identifier (ID), the first synchronization signal includes a first primary-synchronization signal and a first secondary-synchronization signal. The first primary-synchronization-signal carries a first ID, the first secondary-synchronization signal carries a second ID, the synchronization ID is determined according to the first ID and the second ID.

In a possible implementation, the synchronization information includes at least one of: the synchronization ID, a start of a superframe, an index of a superframe, a start of a frame, or an index of a frame.

In a possible implementation, the processing unit is further configured to transmit, through the communication unit, a first channel, where the first channel indicates resource configuration information of at least one communication sub-system in the wireless communication system.

In a possible implementation, a number of bits occupied by the first channel is associated with a number of secondary control devices related to the second control device.

In a possible implementation, the number of bits occupied by the first channel is indicated by the first synchronization signal, or, the number of bits occupied by the first channel is determined according to a number of communication sub-systems in the wireless communication system indicated by the first synchronization signal.

In a possible implementation, a time-frequency resource location of the first synchronization signal and a time-frequency resource location of the first channel are in a preset relationship.

In a possible implementation, the first channel carries first information and second information. The first information is applicable to a system to which the second control device belongs and a system to which at least one secondary control device belongs. The second information is applicable to the system to which the second control device belongs or a system to which one of the at least one secondary control device belongs.

In a possible implementation, the first information includes at least one of: subcarrier spacing, system frame number; the second information includes at least one of: a communication sub-system ID, scheduling information for communication sub-system dedicated broadcast information.

In a possible implementation, the first information further includes indication information, the indication information indicates a time-frequency resource location for transmitting a channel by each of secondary control devices associated with the second control device.

In a possible implementation, the first information further includes indication information, the indication information indicates a time-frequency resource location for transmitting a synchronization signal by each of the secondary control devices.

In a possible implementation, the time-frequency resource location for transmitting the channel by each of at least one secondary control device and the time-frequency resource location for transmitting the synchronization signal by each of the at least one secondary control device are in a preset relationship.

Figure 23:
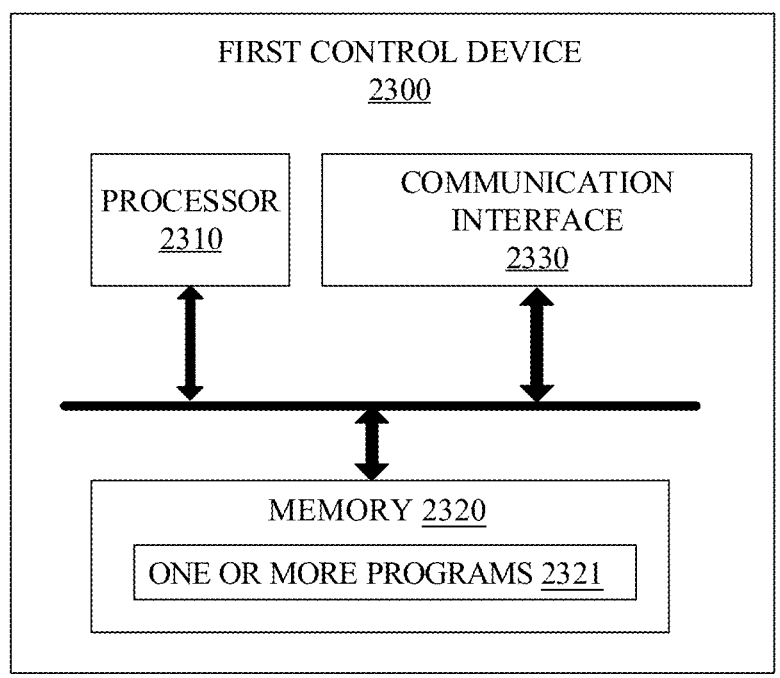
FIG. 23 is a schematic structural diagram of a first control device provided in implementations of the disclosure.

Referring to FIG. 23, FIG. 23 is a schematic structural diagram of a first control device provided in implementations of the disclosure. The first control device 2300 includes a processor 2310, a memory 2320, a communication interface 2330, and at least one communication bus configured for connecting the processor 2310, the memory 2320, and the communication interface 2330.

The memory 2320 includes, but is not limited to, a random access memory (RAM), a read-only memory (ROM), an erasable programmable read only memory (EPROM), or a compact disc read-only memory (CD-ROM). The memory 2320 is configured to store related instructions and data.

The communication interface 2330 is configured to receive and transmit data.

The processor 2310 may be one or more CPUs. When the processor 2310 is one CPU, the CPU may be a single-core CPU or a multicore CPU.

It should be noted that, the processor 2310 in the first control device 2300 is configured to read one or more program codes 2321 stored at the memory 2320 to perform methods in the foregoing method implementations, which will not be repeated herein.

Figure 24:
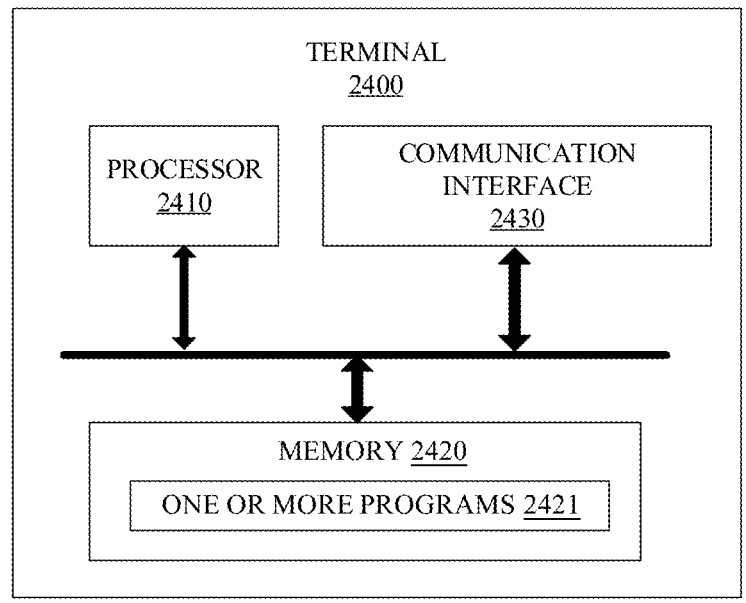
FIG. 24 is a schematic structural diagram of a terminal provided in implementations of the disclosure.

Referring to FIG. 24, FIG. 24 is a schematic structural diagram of a terminal provided in implementations of the disclosure. The terminal 2400 includes a processor 2410, a memory 2420, a communication interface 2430, and at least one communication bus configured for connecting the processor 2410, the memory 2420, and the communication interface 2430.

The memory 2420 includes, but is not limited to, an RAM, an ROM, an EPROM, or a CD-ROM. The memory 2420 is configured to store related instructions and data.

The communication interface 2430 is configured to receive and transmit data.

The processor 2410 may be one or more CPUs. When the processor 2410 is one CPU, the CPU may be a single-core CPU or a multicore CPU.

It should be noted that, the processor 2410 in the terminal 2400 is configured to read one or more program codes 2021 stored at the memory 2420 to perform methods in the foregoing method implementations, which will not be repeated herein.

Figure 25:
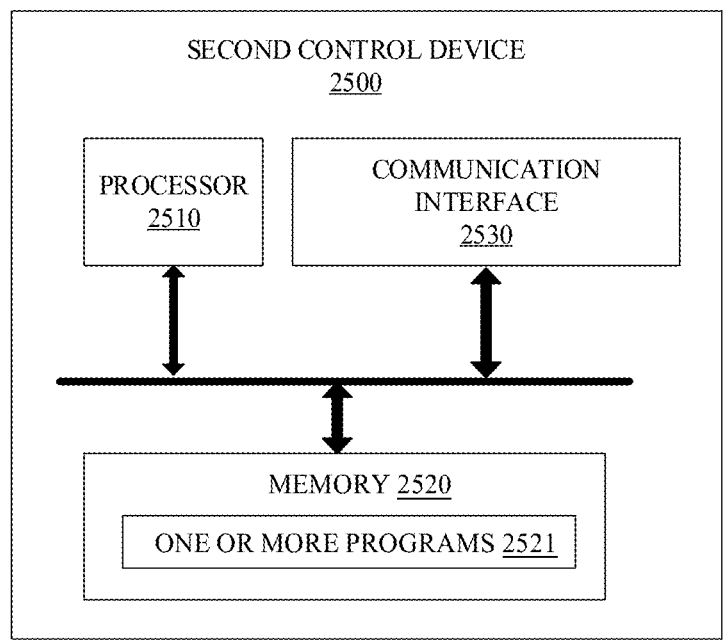
FIG. 25 is a schematic structural diagram of a second control device provided in implementations of the disclosure.

Referring to FIG. 25, FIG. 25 is a schematic structural diagram of a second control device provided in implementations of the disclosure. The second control device 2500 includes a processor 2510, a memory 2520, a communication interface 2530, and at least one communication bus configured for connecting the processor 2510, the memory 2520, and the communication interface 2530.

The memory 2520 includes, but is not limited to, an RAM, an ROM, an EPROM, or a CD-ROM. The memory 2520 is configured to store related instructions and data.

The communication interface 2530 is configured to receive and transmit data.

The processor 2510 may be one or more CPUs. When the processor 2510 is one CPU, the CPU may be a single-core CPU or a multicore CPU.

It should be noted that, the processor 2510 in the second control device 2500 is configured to read one or more program codes 2521 stored at the memory 2520 to perform methods in the foregoing method implementations, which will not be repeated herein.

A chip including a processor is provided in implementations of the disclosure, which is configured to invoke and run a computer program from a memory, such that a device installed with the chip performs part or all of the steps performed by the first control device, the terminal, or the second control device described in implementations of the disclosure.

A computer readable storage medium is provided in implementations of the disclosure. The computer readable storage medium stores computer programs for electronic data exchange. The computer programs are operable with a computer to perform part or all of the steps performed by the first control device, the terminal, or the second control device described in implementations of the disclosure.

A computer program product is provided in implementations of the disclosure. The computer program product includes a computer program. The computer program is operable with a computer to perform part or all of the steps performed by the first control device, the terminal, or the second control device described in implementations of the disclosure. The computer program product may be a software installation package.

The operations of methods or algorithm described in implementations of the disclosure may be implemented in a manner of hardware, or may be implemented in a manner that a processor executes software instructions. The software instructions can be composed of corresponding software modules. The software modules can be stored in an RAM, a flash memory, an ROM, a PROM, an EPROM, an electrically EPROM (EEPROM), a register, a hard disk, a mobile hard disk drive, a CD-ROM, or other storage media known in related art. An exemplary storage medium is coupled to the processor, such that the processor can read information from and write information to the storage medium. Of course, the storage medium can also be an integral part of the processor. The processor and the storage medium may reside in an application specific integrated circuit (ASIC).

Those skilled in the art should readily recognize that, in one or more examples mentioned above, functions described in implementations of the disclosure may be implemented wholly or partly by software, hardware, firmware, and combinations thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatus. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line etc. The wireless manner can be, for example, infrared, wireless, microwave, etc. The computer readable storage medium can be any computer accessible usable-medium or a data storage device such as a server, a data center, or the like which is integrated with one or more usable medias. The usable medium can be a magnetic medium (such as a soft disc, a hard disc, or a magnetic tape), an optical medium (such as a digital video disc), or a semiconductor medium (such as a solid state disk), etc.

The specification mentioned above describe the purposes, technical schemes and beneficial effects of the implementations of the disclosure in further detail. It can be understood that the above are merely specific embodiments of the implementations of the disclosure, and are not intended to limit protection scope of the disclosure. Any modification, equivalent arrangements, and improvement made based on the technical schemes of the implementations of the disclosure shall be included in the protection scope of the disclosure.

What is claimed is:

1. A wireless communication method, comprising:
receiving, by a first control device, a first synchronization signal from a second control device; and
determining, by the first control device, synchronization information of a first system to which the first control device belongs according to the first synchronization signal, wherein the first system is a communication sub-system formed by the first control device and at least one terminal controlled by the first control device;
receiving, by the first control device, a first channel transmitted by the second control device; and
determining, by the first control device, first resource-configuration-information of the first system to which the first control device belongs according to the first channel.

2. The method of claim 1, wherein the first synchronization signal comprises a first primary-synchronization signal and a first secondary-synchronization signal, the first primary-synchronization signal carries a first identifier (ID), the second secondary-synchronization signal carries a second ID.

3. The method of claim 1, wherein the synchronization information comprises at least one of: a start of a superframe, an index of a superframe, a start of a frame, or an index of a frame.

4. The method of claim 1, wherein determining, by the first control device, the first resource-configuration-information of the first system to which the first control device belongs according to the first channel comprises:
obtaining, by the first control device, scheduling information for first system-broadcast-information according to the first channel; and
obtaining, by the first control device, the first resource-configuration-information by reading, according to the scheduling information, the first system-broadcast-information transmitted by the second control device.

5. The method of claim 1, further comprising:
transmitting, by the first control device, a second synchronization signal and a third channel according to the first resource-configuration-information.

6. The method of claim 5, wherein the second synchronization signal comprises a second primary-synchronization signal and a second secondary-synchronization signal.

7. The method of claim 5, wherein the first resource-configuration-information contains a time-frequency resource location of the second synchronization signal and a time-frequency resource location of the third channel.

8. The method of claim 5, wherein a synchronization ID corresponding to the second synchronization signal transmitted by the first control device does not overlap with a synchronization ID corresponding to the first synchronization signal transmitted by the second control device.

9. The method of claim 5, wherein the synchronization ID corresponding to the second synchronization signal transmitted by the first control device is allocated by the second control device within a corresponding value range.

10. The method of claim 1, wherein the first control device is a secondary control device, the second control device is a primary control device.

11. A wireless communication method, performed by a second control device and comprising:
transmitting, by the second control device, a first synchronization signal, wherein the first synchronization signal provides synchronization information of at least one communication sub-system in a wireless communication system; and
transmitting, by the second control device, a first channel, wherein the first channel indicates resource configuration information of at least one communication sub-system in the wireless communication system.

12. The method of claim 11, wherein the first synchronization signal comprises a first primary-synchronization signal and a first secondary-synchronization signal, the first primary-synchronization-signal carries a first identifier (ID), the first secondary-synchronization signal carries a second ID.

13. The method of claim 11, wherein the synchronization information comprises at least one of: a start of a superframe, an index of a superframe, a start of a frame, or an index of a frame.

14. A device, being a first control device and comprising:
a transceiver;
a processor; and
a memory storing computer programs which, when executed by the processor, are operable with the processor to:
cause the transceiver to receive a first synchronization signal from a second control device; and
determine synchronization information of a first system to which the first control device belongs according to the first synchronization signal, wherein the first system is a communication sub-system formed by the first control device and at least one terminal controlled by the first control device;
cause the transceiver to receive a first channel transmitted by the second control device; and
determine first resource-configuration-information of the first system to which the first control device belongs according to the first channel.

15. The device of claim 14, wherein the first synchronization signal comprises a first primary-synchronization signal and a first secondary-synchronization signal, the first primary-synchronization signal carries a first identifier (ID), the second secondary-synchronization signal carries a second ID.

16. The device of claim 14, wherein the synchronization information comprises at least one of: a start of a superframe, an index of a superframe, a start of a frame, or an index of a frame.

17. The device of claim 14, wherein the processing unit configured to determine the first resource-configuration-information of the first system to which the first control device belongs according to the first channel is configured to:
obtain, by the first control device, scheduling information for first system-broadcast-information according to the first channel; and
obtain, by the first control device, the first resource-configuration-information by reading, according to the scheduling information, the first system-broadcast-information transmitted by the second control device.

* * * * *